US012800786B2

(12) United States Patent
Widmaier et al.

(10) Patent No.: US 12,800,786 B2
(45) Date of Patent: Nov. 17, 2026

(54) EXTENDED LONG OFFSET ACQUISITION WITH CONSTANT OR DYNAMICALLY ADJUSTED OFFSET COVERAGE GAP

(71) Applicant: PGS Geophysical AS, Oslo (NO)

(72) Inventors: Martin Widmaier, Oslo (NO); Ashish Misra, Weybridge (GB); Manuel Beitz, Holmestrand (NO)

(73) Assignee: PGS Geophysical AS, Oslo (NO)

( * ) Notice: Subject to any disclaimer, the term of this patent is extended or adjusted under 35 U.S.C. 154(b) by 511 days.

(21) Appl. No.: 18/377,237

(22) Filed: Oct. 5, 2023

(65) Prior Publication Data

US 2024/0134079 A1 Apr. 25, 2024
US 2024/0230941 A9 Jul. 11, 2024

Related U.S. Application Data

(60) Provisional application No. 63/417,816, filed on Oct. 20, 2022.

(51) Int. Cl.

| | |
|---|---|
| ***G01V 1/38*** | (2006.01) |
| ***G01V 1/28*** | (2006.01) |
| ***G01V 1/30*** | (2006.01) |
| ***G01V 1/34*** | (2006.01) |

(52) U.S. Cl.
CPC ............ *G01V 1/3843* (2013.01); *G01V 1/282* (2013.01); *G01V 1/303* (2013.01); *G01V 1/345* (2013.01)

(58) Field of Classification Search
None
See application file for complete search history.

(56) References Cited

U.S. PATENT DOCUMENTS

| | | | |
|---|---|---|---|
| 2,757,356 | A | 7/1956 | Haggerty |
| 3,744,021 | A | 7/1973 | Todd |
| 4,693,336 | A | 9/1987 | Newman |
| 4,914,636 | A | 4/1990 | Garotta |
| 4,970,696 | A | 11/1990 | Crews et al. |
| 5,083,297 | A | 1/1992 | Ostrander |
| 5,136,553 | A | 8/1992 | Kelly et al. |
| 5,148,406 | A | 9/1992 | Brink et al. |

(Continued)

FOREIGN PATENT DOCUMENTS

| | | |
|---|---|---|
| CA | 2300116 C | 3/1999 |
| EP | 2 261 615 A2 | 12/2010 |

(Continued)

OTHER PUBLICATIONS

Search Report in EP25208344.9 (pp. 22003-EP02) dated Jan. 21, 2026.

(Continued)

*Primary Examiner* — Raymond L Nimox

(57) ABSTRACT

A marine seismic survey comprises towing a first source and a first streamer spread having a length L behind a first vessel. Sensors in the streamer spread record signals from the first source over a range of offset distances X to X+L. A second source is towed behind a second vessel that does not tow a streamer spread. Sensors in the streamer spread record signals from the second source over a range of offset distances A+L to A+2L. Sensors in the streamer spread do not record signals over a range of offset distances X+L to A+L from any active seismic sources used in the marine seismic survey.

28 Claims, 12 Drawing Sheets

(56) References Cited

U.S. PATENT DOCUMENTS

| | | | |
|---|---|---|---|
| 5,345,522 | A | 9/1994 | Vali et al. |
| 5,424,999 | A | 6/1995 | Manin |
| 5,761,152 | A | 6/1998 | Jacobsen et al. |
| 5,973,995 | A | 10/1999 | Walker et al. |
| 6,510,390 | B1 | 1/2003 | Bunting et al. |
| 6,925,386 | B2 | 8/2005 | Pramik et al. |
| 7,123,543 | B2 | 10/2006 | Vaage et al. |
| 7,379,386 | B2 | 5/2008 | Muyzert et al. |
| 7,450,467 | B2 | 11/2008 | Tveide et al. |
| 7,577,060 | B2 | 8/2009 | Toennessen et al. |
| 7,957,221 | B2 | 6/2011 | Kluver et al. |
| 8,873,332 | B2 | 10/2014 | Mandroux et al. |
| 8,908,469 | B2 | 12/2014 | Hill et al. |
| 9,019,796 | B2 | 4/2015 | Guevel et al. |
| 9,075,162 | B2 | 7/2015 | Baardman et al. |
| 9,103,943 | B2 | 8/2015 | Cowlard et al. |
| 9,250,345 | B2 | 2/2016 | Mattsson |
| 9,261,619 | B2 | 2/2016 | Mandroux et al. |
| 9,310,503 | B2 | 4/2016 | Rentsch et al. |
| 9,360,575 | B2 | 6/2016 | Etienne et al. |
| 9,405,029 | B2 | 8/2016 | Howieson et al. |
| 9,429,667 | B2 | 8/2016 | Vyas et al. |
| 9,513,391 | B2 | 12/2016 | Keers et al. |
| 9,599,735 | B2 | 3/2017 | Oscarsson |
| 9,651,695 | B2 | 5/2017 | Lu et al. |
| 9,733,376 | B2 | 8/2017 | Landais et al. |
| 9,772,418 | B2 | 9/2017 | Sykes |
| 9,880,047 | B2 | 1/2018 | Martin et al. |
| 9,880,048 | B2 | 1/2018 | Martin et al. |
| 9,897,713 | B2 | 2/2018 | Vageskar et al. |
| 9,910,176 | B2 | 3/2018 | McKey, III |
| 9,932,093 | B2 | 4/2018 | Sudow et al. |
| 9,958,564 | B2 | 5/2018 | Grenie et al. |
| 10,001,576 | B2 | 6/2018 | Grenie et al. |
| 10,031,248 | B2 | 7/2018 | Bernitsas et al. |
| 10,042,073 | B2 | 8/2018 | Bjornemo et al. |
| 10,054,705 | B2 | 8/2018 | Hillesund et al. |
| 10,073,184 | B2 | 9/2018 | Faber et al. |
| 10,094,942 | B2 | 10/2018 | Brenders et al. |
| 10,139,269 | B2 | 11/2018 | Den Boer et al. |
| 10,139,511 | B2 | 11/2018 | Mensch |
| 10,234,585 | B2 | 3/2019 | Long |
| 10,267,939 | B2 | 4/2019 | Eick et al. |
| 10,281,602 | B2 | 5/2019 | Modloveanu et al. |
| 10,338,258 | B2 | 7/2019 | Chalenski |
| 10,379,256 | B2 | 8/2019 | Adams et al. |
| 10,459,100 | B2 | 10/2019 | Hegna |
| 10,479,455 | B2 | 11/2019 | Toennessen |
| 10,557,761 | B2 | 2/2020 | Molteni et al. |
| 10,627,534 | B2 | 4/2020 | Bernitsas |
| 10,712,463 | B2 | 7/2020 | Leveille et al. |
| 11,480,700 | B2 | 10/2022 | Siliqi et al. |
| 2004/0218470 | A1 | 11/2004 | Vaage |
| 2006/0133200 | A1 | 6/2006 | Tenghamn |
| 2008/0137480 | A1 | 6/2008 | MacNeill |
| 2009/0147620 | A1 | 6/2009 | Pan et al. |
| 2009/0296518 | A1 | 12/2009 | MacNeill et al. |
| 2009/0296520 | A1 | 12/2009 | Keers et al. |
| 2010/0313659 | A1 | 12/2010 | Berg et al. |
| 2011/0090760 | A1 | 4/2011 | Rickett et al. |
| 2011/0199857 | A1 | 8/2011 | Garden |
| 2011/0305107 | A1 | 12/2011 | Eick et al. |
| 2012/0014212 | A1 | 1/2012 | Eick et al. |
| 2012/0020184 | A1 | 1/2012 | Wilson et al. |
| 2012/0092956 | A1 | 4/2012 | Soubaras |
| 2012/0147699 | A1 | 6/2012 | Dellinger et al. |
| 2012/0227504 | A1 | 9/2012 | Goldner et al. |
| 2013/0114373 | A1 | 5/2013 | Mandroux et al. |
| 2013/0170316 | A1 | 7/2013 | Mandroux |
| 2014/0160885 | A1 | 6/2014 | Tenghamn |
| 2014/0198611 | A1 | 7/2014 | Siliqi |
| 2014/0200815 | A1 | 7/2014 | Hung et al. |
| 2014/0241118 | A1 | 8/2014 | Landais et al. |
| 2015/0003195 | A1 | 1/2015 | Widmaier et al. |
| 2015/0009779 | A1* | 1/2015 | Mandroux ............... G01V 1/02 367/15 |
| 2015/0078124 | A1 | 3/2015 | Lu et al. |
| 2015/0234065 | A1 | 8/2015 | Lecocq et al. |
| 2015/0241587 | A1 | 8/2015 | Baardman |
| 2015/0293250 | A1 | 10/2015 | Baardman et al. |
| 2015/0346368 | A1 | 12/2015 | Dellinger et al. |
| 2016/0097870 | A1 | 4/2016 | Routh et al. |
| 2016/0131784 | A1 | 5/2016 | Siliqi et al. |
| 2016/0131785 | A1 | 5/2016 | Tonchia |
| 2016/0139284 | A1 | 5/2016 | Meech |
| 2016/0187504 | A1 | 6/2016 | Brenders et al. |
| 2016/0238730 | A1 | 8/2016 | Malling et al. |
| 2016/0245941 | A1 | 8/2016 | Ronholt et al. |
| 2016/0356907 | A1 | 12/2016 | Mensch |
| 2016/0363682 | A1 | 12/2016 | Grenie et al. |
| 2017/0075010 | A1 | 3/2017 | Mandroux et al. |
| 2017/0075011 | A1 | 3/2017 | Ni et al. |
| 2017/0168178 | A1 | 6/2017 | Crawley et al. |
| 2017/0176636 | A1 | 6/2017 | Adams et al. |
| 2017/0205520 | A1 | 7/2017 | Moldoveanu et al. |
| 2017/0285197 | A1 | 10/2017 | Bernitsas |
| 2017/0363760 | A1 | 12/2017 | Mensch et al. |
| 2017/0371069 | A1 | 12/2017 | Malling |
| 2018/0002526 | A1 | 1/2018 | Hillesund |
| 2018/0156933 | A1 | 6/2018 | Ahmed |
| 2018/0164456 | A1 | 6/2018 | Chalenski |
| 2018/0164457 | A1 | 6/2018 | Beitz et al. |
| 2018/0172856 | A1 | 6/2018 | Hillesund |
| 2018/0274953 | A1 | 9/2018 | Molteni |
| 2018/0306937 | A1 | 10/2018 | Bagaini et al. |
| 2019/0064380 | A1 | 2/2019 | Sharma |
| 2019/0154858 | A1 | 5/2019 | Long |
| 2020/0012004 | A1* | 1/2020 | Elboth ................. G01V 1/3835 |
| 2020/0393590 | A1 | 12/2020 | Tenghamn |
| 2021/0048545 | A1* | 2/2021 | Strand .................. G01V 1/3861 |
| 2021/0124073 | A1 | 4/2021 | Tenghamn |
| 2021/0124074 | A1 | 4/2021 | Tenghamn |
| 2021/0141117 | A1 | 5/2021 | Tenghamn et al. |
| 2023/0273334 | A1 | 8/2023 | Cramer et al. |

FOREIGN PATENT DOCUMENTS

| | | | | |
|---|---|---|---|---|
| EP | 3 088 919 | A1 | 11/2016 | |
| EP | 3 101 451 | | 12/2016 | |
| GB | 1506189 | | 4/1978 | |
| GB | 2394051 | A | 4/2004 | |
| GB | 2404025 | A | 1/2005 | |
| GB | 2425596 | A | 11/2006 | |
| GB | 2 460 073 | | 11/2009 | |
| GB | 2491260 | A | 11/2012 | |
| GB | 2494040 | A | 2/2013 | |
| GB | 2 497 645 | A | 6/2013 | |
| GB | 2 515 658 | | 12/2014 | |
| GB | 2 536 052 | A | 9/2016 | |
| GB | 2567059 | A | 4/2019 | |
| GB | 2 589 011 | A | 5/2021 | |
| GB | 2599849 | A | 4/2022 | |
| WO | 9618117 | A1 | 6/1996 | |
| WO | 2009131619 | A2 | 10/2009 | |
| WO | 2012 054 635 | A2 | 4/2012 | |
| WO | 2014 022 346 | A1 | 2/2014 | |
| WO | 2014 161 044 | | 10/2014 | |
| WO | 2014161044 | A1 | 10/2014 | |
| WO | 2015 011 247 | | 1/2015 | |
| WO | 2015195939 | A1 | 12/2015 | |
| WO | 2016 009 270 | | 1/2016 | |
| WO | 2016011250 | A1 | 1/2016 | |
| WO | 2017102289 | A1 | 6/2017 | |
| WO | 2017 195 093 | A1 | 11/2017 | |
| WO | 2018217872 | A1 | 11/2018 | |
| WO | 2018 229 553 | | 12/2018 | |
| WO | WO-2018229553 | A1 * | 12/2018 | .......... G01V 1/3808 |
| WO | 2019 018 894 | A1 | 1/2019 | |
| WO | 2019 043 452 | A1 | 3/2019 | |
| WO | 2019 246 297 | | 12/2019 | |

(56) References Cited

FOREIGN PATENT DOCUMENTS

| | | | |
|---|---|---|---|
| WO | 2020 008 259 | A1 | 1/2020 |
| WO | 2022 016 049 | | 1/2022 |

OTHER PUBLICATIONS

AU Examination Report in AU2020260397 (pp. 19125-AU01) dated Aug. 20, 2025.
CA Examination Report in CA2021041957 (pp. 20110-CA01) dated May 29, 2025.
No Office Action in No. 20210064 (pp. 18113-NO01) dated Oct. 20, 2025.
AU Examination Report in AU2019290138 dated Jan. 16, 2024.
GB Examination Report in GB2017036.1 dated Apr. 22, 2021.
GB Examination Report in GB2017036.1 dated Sep. 20, 2021.
GB Examination Report in GB1813957.6 dated Nov. 8, 2021.
GB Examination Report in GB2100684.6 dated Jan. 25, 2022.
GB Examination Report in GB2017036.1 dated Feb. 14, 2022.
GB Examination Report in GB2203858.2 dated Apr. 1, 2022.
GB Examination Report in GB2100684.6 dated May 11, 2022.
GB Examination Report in GB2017036.1 dated Jun. 17, 2022.
GB Search Report in GB1813957.6 dated Jan. 24, 2019.
GB Search Report in GB2017061.9 dated Mar. 15, 2021.
GB Examination Report in GB2017061.9 dated Jul. 14, 2023.
International Search Report and Written Opinion in PCT/US2019/038035 dated Sep. 9, 2019.
International Search Report and Written Opinion in PCT/US2021/041957 dated Oct. 27, 2021.
International Search Report and Written Opinion in PCT/EP2023/078366 dated Feb. 2, 2024.
A. Long, "Increasing Towed Streamer Survey Efficiency", Aug. 18, 2018, accessed by web https://www.pgs.com/globalassets/lechnical-library/tech-lib-pdfs/industry_insights_increasing-towed-streamer-survey-efficiency_aug2018_al.pdf, 15 pages.
Brenders, Andrew et al., "Realistic Signal-to-Noise Ratios for Synthetic Seismic Data: Calibrating with Measured Noise and Applications to Waveform Inversion", SEG International Exposition and 86th Annual Meeting, pp. 3992-3996, copyright 2016 SEG, 5 pages.
Brenders, Drew et al., Realistic signal-to-noise ratios for synthetic seismic data: Calibrating with measured noise and applications to waveform inversion, Presentation, Society of Exploration Geophysicists, 49 pages.
Cortland Company Brochure, Seismic Tow Cables, Umbilicals, Straps and Ropes, 7 pages.
Dellinger, Joe et al., "Challenges to extending the usable seismic bandwidth at the seafloor in the deep water GoM", SEG International Exposition and 86th Annual Meeting, pp. 66-70, Copyright 2016 SEG, 5 pages.
Dellinger, Joe et al., "Challenges to extending the usable seismic bandwidth at the seafloor in the deep water GoM", Presentation, Society of Exploration Geophysicists, 50 pages.
Dellinger, Joe et al., Wolfspar®, an "FWI-friendly" ultra-low-frequency marine seismic source, SEG International Exposition and 86th Annual Meeting, pp. 4891-4895, Copyright 2016 SEG, 5 pages.
Dellinger, Joe et al., Wolfspar®, an "FWI-friendly" ultra-low-frequency marine seismic source, Presentation, Society of Exploration Geophysicists, 47 pages.
Duey, "All in One, Vessel Deploys Dtreamers and Nodes while Provising Sources" E&P Nov. 2017.
Karlsson, et al., "Multivessel Surveying Reduces Seismic Cost, Acquisition Time," Offshore, vol. 51, No. 3, Abstract (Petroleum Publishing Co. Mar. 1, 1991).
Lambert, et al., "Seismic Acquisition: Marine seismic survey positioning and control requirements evolve," Offshore Magazine, Mar. 1, 2003, 10 pages.
Long, "Evolutions in seismic azimuth: past, present and future," Geohorizons, Jul. 2009, pp. 1-14.
Lopez, et al., "Fully Autonomous Marine Seismic Acquisition Systems for Rerservoir Monitoring," prepared or presentation during the 16th International Congress of the Brazilian Geophysical Society held in Rio de Janeiro, Brazil, Aug. 19-22, 2019, pp. 1-5.
Molteni, et al., "Use of distributed fibre—Optic sensing for marine seismic measurements," Special Topic: Petroleum Geology and Basins, First Break (EAGE publication), vol. 34, Dec. 2016, pp. 53-60.
PGS Article, "3D Spread Control", Control of streamer depth and lateral position, Sep. 6, 2018, accessed by web, https://www.pgs.com/marine-acquisition/tools-and-techniques/operational-efficiency/technology/slreamer-steering/, 3 pages.
PGS Article, "Ramform + Triple Source= Ultra HD3D", Jun. 1, 2018, accessed by web https://www.pgs.com/publications/feature-stories/ramform-plus-Iriple-source-equals-ultra-hd3d/, 5 pages.
Poole, et al., "Shot-to-shot directional designature using near-field hydrophone data," SEG Houston 2013 Annual Meeting, 5 pages.
Press Release, "SeaBird to enter into a strategic cooperation with PGS for deep water node seismic and to issue a NOK 240 million convertibel loan to PGS" (Cyprus Jan. 27, 2011).
Tham, et al., "A Cost-Effective and Efficient Solution for Marine Seismic Acquisition in Obstructed Areas—Acquiring Ocean-Bottom and Towed-Streamer Seismic Data with a Single Multipurpose Vessel," 2017 SEG Workshop: OBN/OBC Technologies and Applications (SEG 2017).
Unger, et al., "Exploration: Redefining Multi-Azimuth Seismic Acquisition," https://www.hartenergy.com/ xclusives/redefining-multi-azimuth-seismic-acquisition-187435, May 2020, 5 pages.
CA Examination Report in CA2021041957 dated May 29, 2025.
Alfaro, et al., "Reducing Exploration Risk," Oilfield Review, Spring 2007 Issue, pp. 26-43 (Schlumberger, Spring 2007).
Vermeer, "Wide-Azimuth Towed Streamer Data Acquisition and Simultaneous Sources," The Leading Edge, vol. 28, Issue 8, pp. 260-268 (SEG, Aug. 2009).
Van Borselen, et al., "Simultaneous Long Offset (SLO)—A Case Study in Long Offset GeoStreamer Seismic Acquisition & Processing," 6th EAGE Saint Petersburg International Conference and Exhibition, vol. 2014, pp. 1-5 (EAGE, Apr. 2014).
"Continuous Long Offset (CLO) Acquisition Technology," Tech Link, vol. 6, No. 4, pp. 1-4 (PGS, Apr. 2006).
Long, et al. "Simultaneous Long Offset (SLO) Towed Streamer Seismic Acquisition," ASEG Extended Abstracts, 2013:1, 1-4 (ASEG, Feb. 12, 2019).
Taipe, et al., "Optimizing Seismic Survey Design for Frontier Exploration in Cyprus Salt Basins," SEG | AAPG International Meeting for Applied Geoscience and Energy (Aug. 31, 2023).
Mensch, et al., "Acquisition of Long-Offset Data Offshore Gabon Shows How Synchronized Source Technology Adds Flexibility to Tailored Acquisition Solutions," First Break, vol. 34, Nov. 2016 (EAGE, Nov. 2016).
Chemingui, et al., "Full Waveform Inversion of Simultaneous Long-Offset Data," 81st EAGE Conference & Exhibition (EAGE, Jun. 3-6, 2019).
Chemingui, et al., "Full Waveform Inversion of Simultaneous Long-Offset Data," (AEGC 2019: From Data to Discovery—Perth, Australia).
Fromyr, "Blended Acquisition—A Potential Step-Change in Geophysical Flexibility and Operational Efficiency," Fifteenth International Congress of the Brazilian Geophysical Society (SBGf, Jul. 31-Aug. 3, 2017).
Long, et al., "Simultaneous Long Offset (SLO) Towed Streamer Seismic Acquisition," White Paper (PGS Jun. 2013).
PGS Geophysical, "Multi-Vessel Configurations," as downloaded from https://www.pgs.com/marine-acquisition/tools-and-techniques/acquisition on Oct. 19, 2019.
BR Examination Report in BR112020025667-6 dated Jun. 25, 2024.
GB Examination Report in GB2300564.8 dated May 3, 2024.
GB Examination Report in GB2300564.8 dated Oct. 4, 2024.
GB Examination Report in GB2017061.9 dated Nov. 21, 2023.
CA Examination Report in CA3189422 dated May 23, 2024.

(56) References Cited

OTHER PUBLICATIONS

NO Office Action in No. 20181128 dated Sep. 5, 2024.
NO Office Action in No. 20181128 dated Jan. 7, 2025.

* cited by examiner

EXTENDED LONG OFFSET ACQUISITION WITH CONSTANT OR DYNAMICALLY ADJUSTED OFFSET COVERAGE GAP

CROSS REFERENCE TO RELATED APPLICATIONS

This application claims benefit to the filing date of U.S. Provisional Patent Application 63/417,816, filed on Oct. 20, 2022, titled "Extended Long Offset Acquisition with Constant or Dynamically Adjusted Offset Gap" (the "Provisional Application"), the contents of which are hereby incorporated by reference as if fully set forth herein. In the event of a conflict between the meaning of a term as used in the Provisional Application and the same or a similar term as used herein, the meaning and usage provided herein shall control.

BACKGROUND

In a typical towed streamer marine seismic survey, a vessel tows a set of elongate streamers along with one or more active seismic sources. Each streamer includes multiple seismic sensors disposed at spaced apart intervals along its length. The sources typically comprise air guns, or marine vibrators, or a combination of these. The sources are activated at intervals as the vessel follows a survey plan over a survey area. Acoustic energy generated by the source activations travels into the subsurface below the water bottom and is reflected by geological formations therein. The sensors in the streamers detect the reflected energy and, in response, generate signals that are recorded by equipment onboard the vessel. Such signals are processed and can be used to, among other things, generate an image of the subsurface geological formations in the survey area.

The term "offset" in a marine seismic survey generally refers to a distance between a source and a sensor or sensor group. The term "long offset" generally refers to an offset distance that is greater than the depth of a relevant subsurface target. For a variety of reasons, it is sometimes necessary or desirable to acquire long offset data to obtain sufficient information about subsurface features that are of interest.

Several problems are presented, however, when it is desired to gather long offset data in a marine seismic survey. Because all of the sensors in a typical towed streamer survey are disposed inside the towed streamers, the maximum offset recordable in such a survey is limited by the streamer length, L. While the streamers used in modern surveys can be very long—on the order of 8 km, for example—it is sometimes necessary to gather data at offsets greater than the length of the streamer spread. Accordingly, U.S. Pat. No. 5,761,152 (the "'152 patent") teaches a method for using towed streamers to acquire data over a continuous range of offsets over which no offset coverage gaps exist. According to the method of the '152 patent, the largest offsets in the continuous range can reach an integer multiple of the streamer length or slightly less.

In alternative approaches, surveys employing sensors in ocean bottom nodes or in ocean bottom cables have also been used to acquire data over a continuous range of offsets over which no offset coverage gaps exist. In the latter approaches, the largest offsets in the continuous range acquired can also reach distances that are larger than the length of a modern seismic streamer. This is so because the sources and receivers are uncoupled in such surveys.

When using any of the aforementioned techniques to acquire data at offsets greater than 2L, either two or more source vessels must be used, or ocean bottom nodes or cables must be deployed. Either solution adds significant cost to the survey relative to the cost of a conventional towed streamer survey. In many cases, the additional cost is prohibitive, and therefore the data actually acquired are suboptimal.

DETAILED DESCRIPTION

This disclosure describes multiple embodiments by way of example and illustration. It is intended that characteristics and features of all described embodiments may be combined in any manner consistent with the teachings, suggestions and objectives contained herein. Thus, phrases such as "in an embodiment," "in one embodiment," and the like, when used to describe embodiments in a particular context, are not intended to limit the described characteristics or features only to the embodiments appearing in that context.

The phrases "based on" or "based at least in part on" refer to one or more inputs that can be used directly or indirectly in making some determination or in performing some computation. Use of those phrases herein is not intended to foreclose using additional or other inputs in making the described determination or in performing the described computation. Rather, determinations or computations so described may be based either solely on the referenced inputs or on those inputs as well as others. The phrase "configured to" as used herein means that the referenced item, when operated, can perform the described function. In this sense an item can be "configured to" perform a function even when the item is not operating and is therefore not currently performing the function. Use of the phrase "configured to" herein does not necessarily mean that the described item has been modified in some way relative to a previous state. "Coupled" as used herein refers to a connection between items. Such a connection can be direct or can be indirect through connections with other intermediate items. Terms used herein such as "including," "comprising," and their variants, mean "including but not limited to." Articles of speech such as "a," "an," and "the" as used herein are intended to serve as singular as well as plural references except where the context clearly indicates otherwise.

Marine Seismic Surveys Generally

Figure 1:
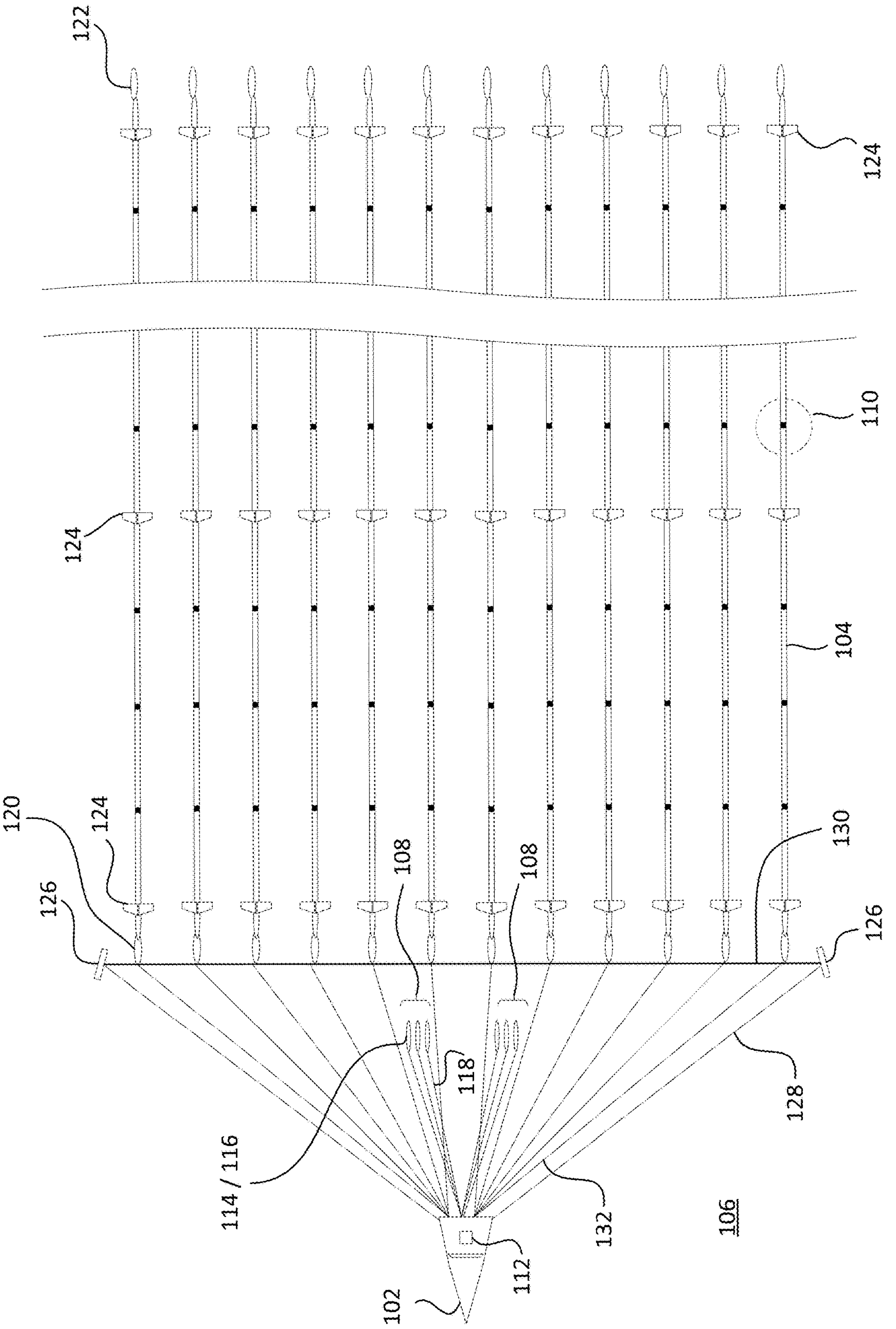
FIGS. 1 and 2 are top and side views, respectively, illustrating an example towed streamer marine seismic survey.
Figure 2:
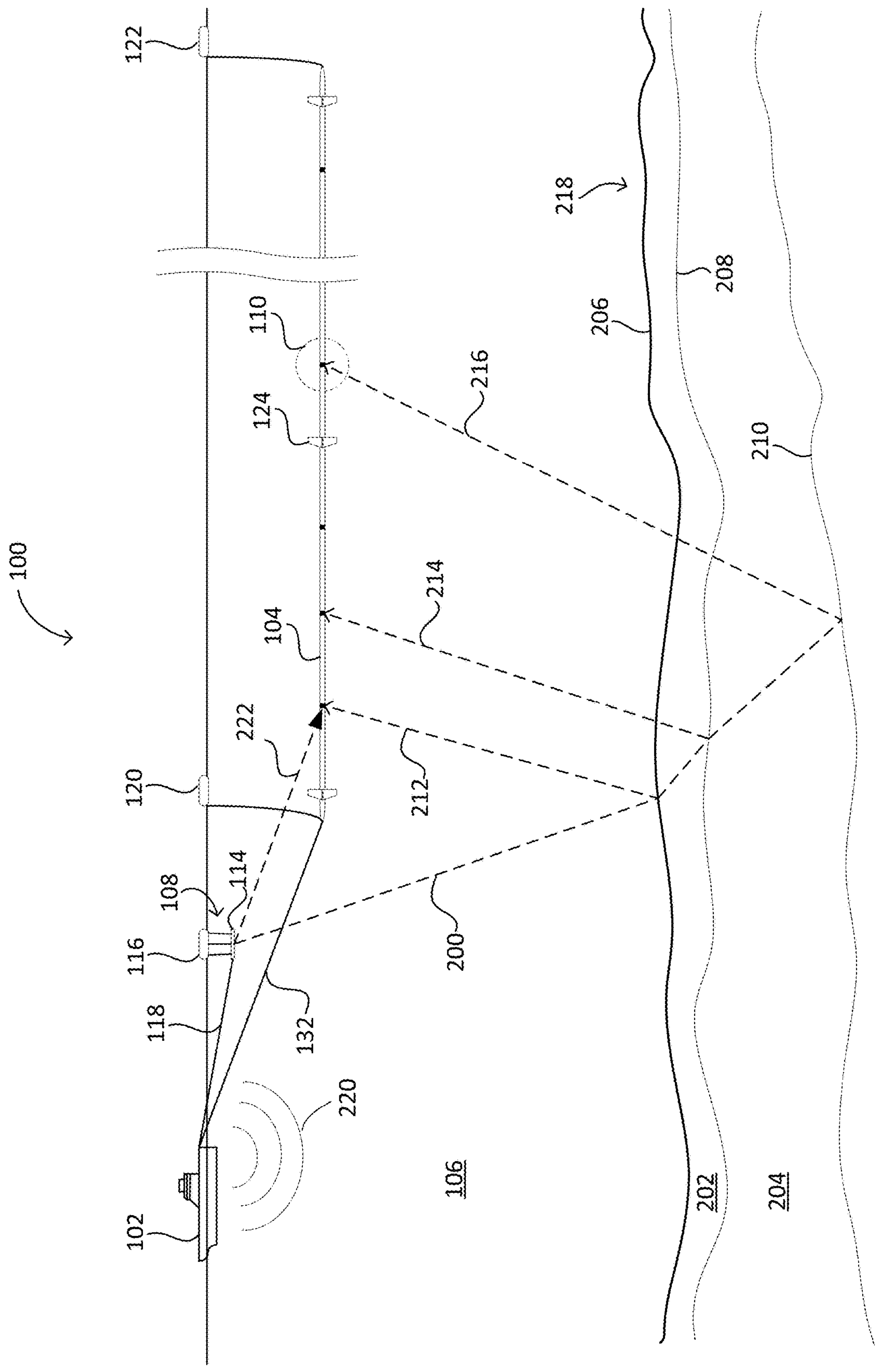

FIGS. 1 and 2 present top and side elevation views, respectively, of an example towed-streamer marine seismic survey system that employs active seismic sources. Survey system 100 is representative of a variety of similar geophysical survey systems in which a vessel 102 tows an array of elongate sensor streamers 104 in a body of water 106 such as an ocean, a sea, a bay, or a large lake. Typically the vessel is equipped with at least one global positioning system ("GPS") unit so that its location during the survey may be known and recorded for later use. Vessel 102 is shown towing twelve streamers 104 in the illustrated example. In other embodiments, any number of streamers may be towed, from as few as one streamer to as many as twenty or more. The terms "streamer" and "cable" as used herein should be interpreted to include any type of seismic sensor cable, and the two terms may be used interchangeably below.

During a typical marine seismic survey, one or more active seismic sources 108 are activated to produce acoustic energy 200 that propagates in body of water 106. Energy 200 penetrates various layers of sediment and rock 202, 204 underlying body of water 106. As it does so, it encounters interfaces 206, 208, 210 between materials having different physical characteristics, including different acoustic impedances. At each such interface, a portion of energy 200 is reflected upward while another portion of the energy is refracted downward and continues toward the next lower interface, as shown. Reflected energy 212, 214, 216 is detected by sensors 110 disposed at intervals along the lengths of streamers 104, along with a so-called direct wavefield that reaches the sensors via a path, such as path 222, that travels directly from the active sources 108 to the location of the sensors. In FIGS. 1 and 2, sensors 110 are indicated as black squares inside each of streamers 104. Sensors 110 produce signals corresponding to the reflected energy. These signals are collected and recorded by control equipment 112 located onboard vessel 102. The recorded signals may be processed and analyzed onboard vessel 102 and/or at one or more onshore data centers to produce images of structures within subsurface 218. These images can be useful, for example, in identifying possible locations of hydrocarbon reservoirs within subsurface 218 or in identifying favorable locations within subsurface 218 for the installation of new structures such as foundations for wind turbines.

Any number of active sources 108 may be used in a marine seismic survey. In the illustrated example, vessel 102 is shown towing two such sources. In other systems, different numbers of sources may be used, and the sources may be towed by other vessels, which vessels may or may not tow additional streamer arrays. Typically, an active source 108 includes one or more source subarrays 114, and each subarray 114 includes one or more acoustic emitters such as air guns or marine vibrators. Each subarray 114 may be suspended at a desired depth from a subarray float 116. Compressed air as well as electrical power and control signals may be communicated to each subarray via source umbilical cables 118. Data may be collected, also via source umbilical cables 118, from various sensors located on subarrays 114 and/or floats 116, such as acoustic transceivers and GPS units. Acoustic transceivers and GPS units so disposed help to accurately determine the positions of each subarray 114 during a survey. In some cases, subarrays 114 may be equipped with steering devices to better control their positions during the survey.

In the context of surveys related to hydrocarbon reservoirs, streamers 104 are often very long—on the order of 5 to 10 kilometers or longer—so usually are constructed by coupling numerous shorter streamer sections together. For surveys related to the installation of wind turbines, the streamers are typically much shorter—on the order of 100 to 500 meters, depending on the water depth. The target depth range in the latter types of surveys is often between 0 and 200 meters, whereas in hydrocarbon reservoir surveys the target depth is typically much deeper. In either case, each streamer 104 may be attached to a dilt float 120 at its proximal end (the end nearest vessel 102) and to a tail buoy 122 at its distal end (the end farthest from vessel 102). Dilt floats 120 and tail buoys 122 may be equipped with GPS units as well, to help determine the positions of each streamer 104 relative to an absolute frame of reference such as the earth. Each streamer 104 may in turn be equipped with acoustic transceivers and/or compass units to help determine their positions between GPS units and/or relative to one another. In many survey systems 100, streamers 104 include steering devices 124 attached at intervals, such as every 300 meters. Steering devices 124 typically provide one or more control surfaces to enable moving the streamer to a desired depth, or to a desired lateral position, or both. Paravanes 126 are shown coupled to vessel 102 via tow ropes 128. As the vessel tows the equipment, paravanes 126 provide opposing lateral forces that straighten a spreader rope 130, to which each of streamers 104 is attached at its proximal end. Spreader rope 130 helps to establish a desired crossline spacing between the proximal ends of the streamers. Power, control, and data communication pathways are housed within lead-in cables 132, which couple the sensors and control devices in each of streamers 104 to the control equipment 112 onboard vessel 102.

Collectively, the array of streamers 104 forms a sensor surface at which acoustic energy is received for recording by control equipment 112. In many instances, it is desirable for the streamers to be maintained in a straight and parallel configuration to provide a sensor surface that is generally flat, horizontal, and uniform. In other instances, an inclined and/or fan shaped receiving surface may be desired and may be implemented using control devices on the streamers such as those just described. Other array geometries may be implemented as well. Prevailing conditions in body of water

106 may cause the depths and lateral positions of streamers 104 to vary at times, of course. In various embodiments, streamers 104 need not all have the same length and need not all be towed at the same depth or with the same depth profile.

Sensors 110 within each streamer 104 may include one or more different sensor types such as pressure sensors (e.g., hydrophones) and/or motion sensors. Examples of motion sensors include velocity sensors (e.g., geophones) and acceleration sensors (e.g., accelerometers) such as micro-electromechanical system ("MEMS") devices. In general, pressure sensors provide a magnitude-only, or scalar, measurement. This is because pressure is not associated with a direction and is, therefore, a scalar quantity. Motion sensors such as velocity sensors and acceleration sensors, however, each provide a vector measurement that includes both a magnitude and, at least implicitly, a direction, as velocity and acceleration are both vector quantities. Velocity sensors and acceleration sensors each may be referred to herein as "motion sensors."

Figure 3:
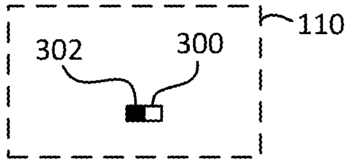
FIGS. 3-5 are schematic views illustrating example arrangements for disposing sensors in a streamer, or in an ocean bottom node, or in an ocean bottom cable.
Figure 4:
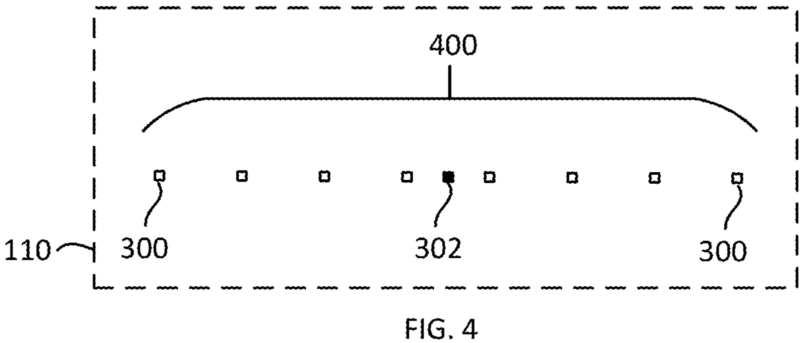
Figure 5:
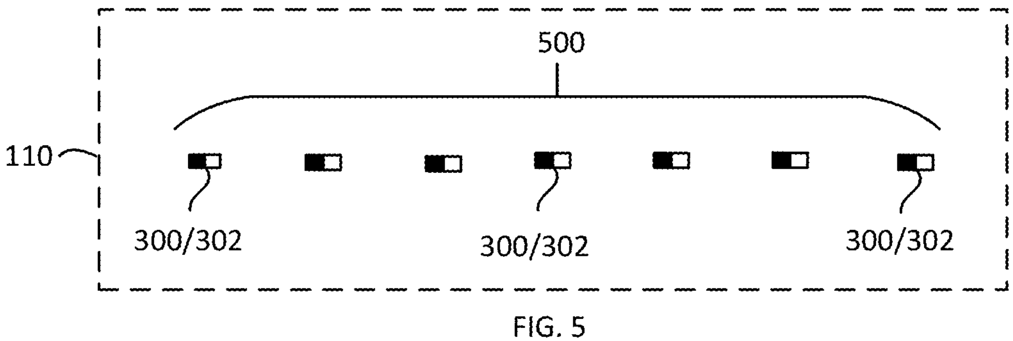

FIGS. 3, 4 and 5 illustrate several example arrangements consistent with embodiments for disposing sensors 110 in a streamer or cable 104 or in an ocean bottom node or in an ocean bottom cable. In each illustration, pressure sensors are indicated with white squares, while motion sensors are indicated with shaded squares.

In the arrangement of FIG. 3, each sensor location 110 comprises a single pressure sensor 300 collocated with a single motion sensor 302. In the arrangement of FIG. 4, each sensor location 110 comprises a set of pressure sensors 300 forming a single pressure sensor group 400. A motion sensor 302 is disposed substantially at the center of pressure sensor group 400. (It is also possible to employ a similar arrangement in which a single pressure sensor is disposed among a group of motion sensors.) Typically, the signals generated by sensors forming a sensor group are combined or aggregated in some way, such as by summation and/or averaging. Such combination or aggregation may be accomplished in any suitable manner, such as in an analog domain using appropriate electrical coupling, or in a digital domain using digital data processing. In general, a sensor group may include any number of sensors and may comprise either pressure sensors or motion sensors. Normally, however, only measurements of the same type in a group (e.g., pressure, velocity, or acceleration) would be subject to combination or aggregation. Thus, in the particular arrangement illustrated in FIG. 4, the measurements of pressure sensors 300 may be combined or aggregated into a single signal, while the measurements of motion sensor 302 would be preserved as a separate signal. In the arrangement of FIG. 5, each sensor location 110 comprises a group 500 of collocated pressure sensors 300 and motion sensors 302. In the latter arrangement, one aggregated signal can be generated from the pressure sensors in the group, while another aggregated signal can be generated from the motion sensors in the group. Various other permutations of the arrangements of FIGS. 3, 4 and 5 are also possible. For example, any of these arrangements may comprise pressure sensors only or motion sensors only.

Figure 6:
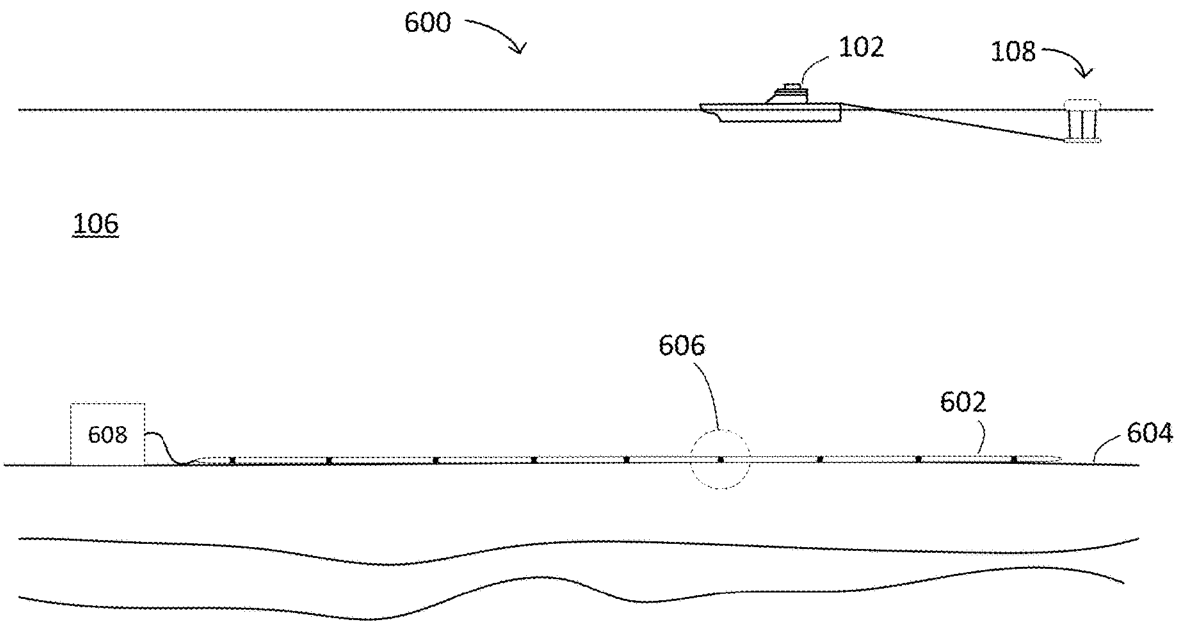
FIG. 6 is a side view illustrating an example ocean bottom cable marine seismic survey.

FIG. 6 illustrates an example ocean bottom cable survey system 600, in which a vessel 102 tows one or more sources 108 over an installation of one or more ocean bottom cables 602, each of which is disposed on a water bottom 604. Each cable 602 may include one or more sensors or sensor groups 606 disposed along its length, generally as shown. In turn, each of the cables may be coupled to a manifold 608 in which signals from the sensors may be aggregated and either stored or transmitted to a collection point, or both.

Figure 7:
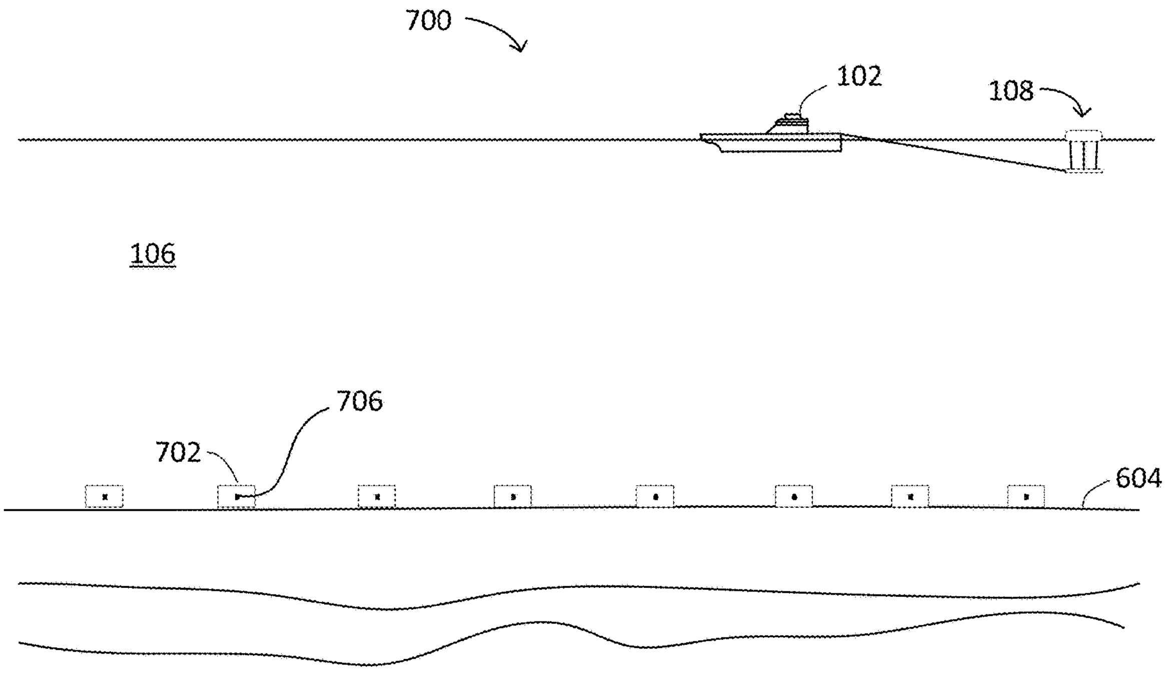
FIG. 7 is a side view illustrating an example ocean bottom node marine seismic survey.

FIG. 7 illustrates an example ocean bottom node survey system 700, in which a vessel 102 tows one or more sources 108 over an installation of one or more ocean bottom nodes 702, each of which is disposed on a water bottom 604. Each node 702 may include one or more sensors or sensor groups 706 as shown. Signals generated by the sensors or sensor groups may be collected in the nodes for later retrieval, or may be transmitted to a collection point, or both.

Techniques to be described herein may be employed in the context of any of the above or similar types of marine seismic surveys.

Offsets in Marine Seismic Surveys

Figure 8:
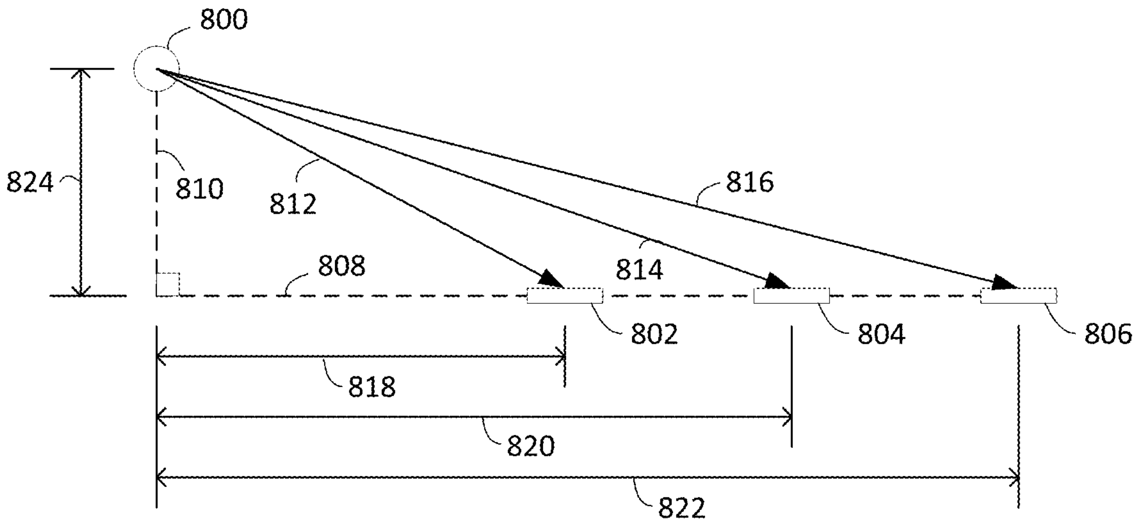
FIG. 8 is a schematic view illustrating offsets in marine seismic surveys.

FIG. 8 is provided to illustrate the concept of offset in marine seismic surveys. In the figure, circle 800 represents a source, while each of rectangles 802, 804, 806 represents a sensor or sensor group. For example, sensors or sensor groups 802-806 may represent sensors disposed along the length of a single streamer 104, or may represent sensors in distinct ocean bottom nodes 702 or sensors disposed within an ocean bottom cable 602. Dashed line 808 depicts an inline direction. Dashed line 810 depicts a crossline direction orthogonal to the inline direction. Typically, a vessel towing a source would follow a sail path parallel to the inline direction 808.

The distance between a source and any one sensor or sensor group constitutes an offset. Such an offset may be measured from the source to a single sensor, or to any one of the sensors within a sensor group, or to the center of a sensor group. Three different example offsets are illustrated in the drawing, ranging in length from a smallest offset 812, to an intermediate length offset 814, to a largest offset 816. A distance along the straight line path between a source and a given sensor or sensor group, as depicted by arrows 812-816, is commonly referred to as a "seismic offset" or simply an "offset." A distance along direction 808 between a source and the inline projection of a sensor or sensor group is commonly referred to as an "inline offset." Thus, sensor or sensor group 802 defines a smallest inline offset 818 with respect to source 800, sensor or sensor group 804 defines an intermediate length inline offset 820 with respect to the source, and sensor or sensor group 806 defines a largest inline offset 822 with respect to the source. Similarly, a distance along direction 810 between a sensor or sensor group and the crossline projection of the source is commonly referred to as a "crossline offset." In the illustrated example, each of sensors or sensor groups 802-806 defines the same crossline offset 824 with respect to source 800.

The unqualified term "offset" when used herein refers to any of the above-described distances.

Example Computer Systems

Figure 9:
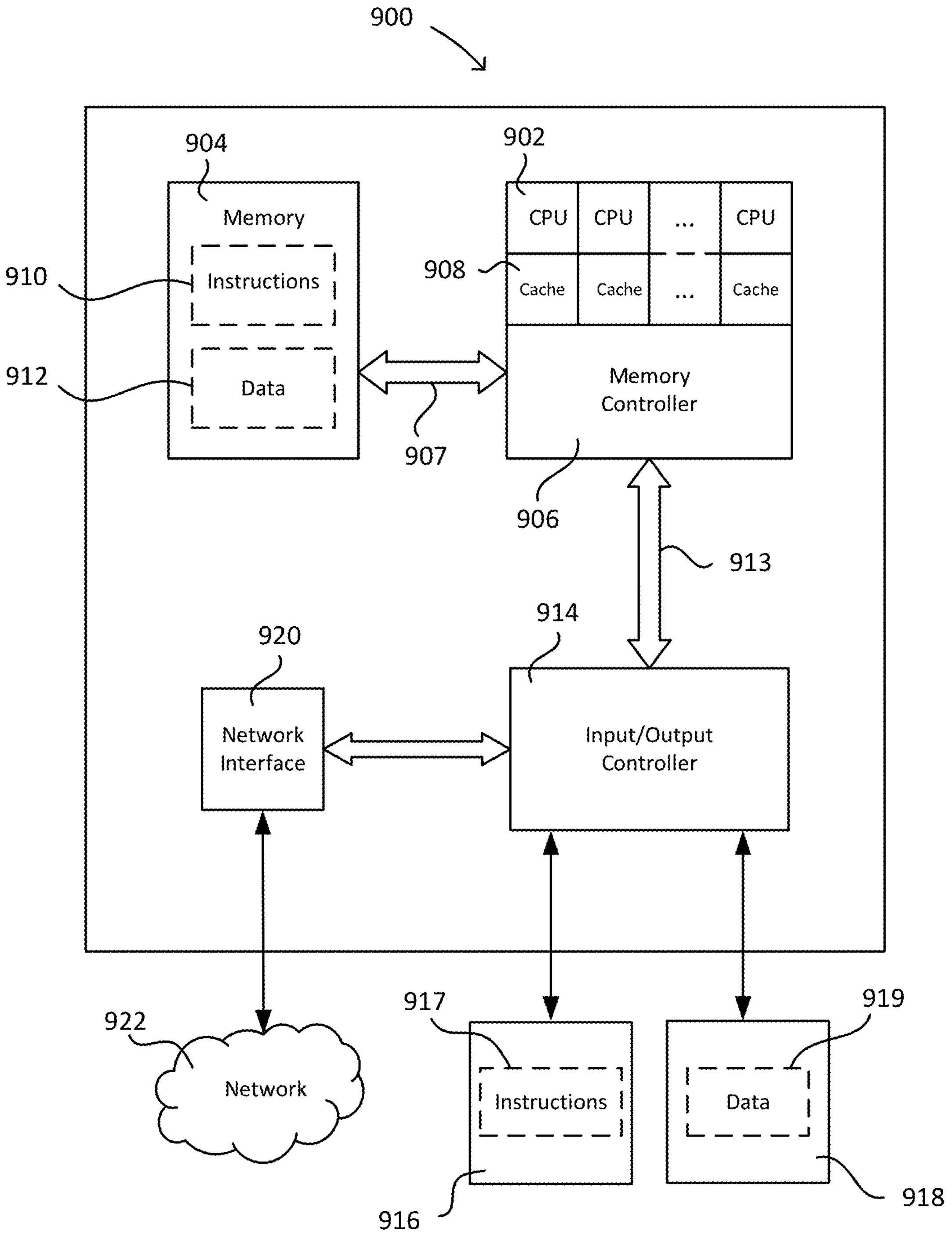
FIG. 9 is a block diagram illustrating an example computing device suitable for use in conjunction with embodiments.

FIG. 9 is a block diagram illustrating an example computer system 900 that may be used to perform any of the methods described herein. A computer system such as computer system 900 may also be used to produce or to execute a computer-readable survey plan that, if followed by navigation and control equipment onboard one or more survey vessels, causes the vessels to perform any of the methods described above.

Computer system 900 includes one or more central processor unit ("CPU") cores 902 coupled to a system memory 904 by a high-speed memory controller 906 and an associated high-speed memory bus 907. System memory 904 typically comprises a large array of random-access memory locations, often housed in multiple dynamic random-access memory ("DRAM") devices, which in turn are housed in one or more dual inline memory module ("DIMM") packages. Each CPU core 902 is associated with one or more levels of high-speed cache memory 908, as shown. Each core 902 can execute computer-readable instructions 910 stored in system memory 904, and can thereby perform operations on data 912, also stored in system memory 904.

Memory controller 906 is coupled, via input/output bus 913, to one or more input/output controllers such as input/output controller 914. Input/output controller 914 is in turn coupled to one or more non-transitory computer readable media such as computer-readable medium 916 and computer-readable medium 918. Non-limiting examples of such computer-readable media include so called solid-state disks ("SSDs"), spinning media magnetic disks, optical disks, flash drives, magnetic tape, and the like. Media 916, 918 may be permanently attached to computer system 900 or may be removable and portable. In the example shown, medium 916 has instructions 917 (software) stored therein, while medium 918 has data 919 stored therein. Operating system software executing on computer system 900 may be employed to enable a variety of functions, including transfer of instructions 910, 917 and data 912, 919 back and forth between media 916, 918 and system memory 904.

Computer system 900 may represent a single, stand-alone computer workstation that is coupled to input/output devices such as a keyboard, pointing device and display. It may also represent one node in a larger, multi-node or multi-computer system such as a cluster, in which case access to its computing capabilities may be provided by software that interacts with and/or controls the cluster. Nodes in such a cluster may be collocated in a single data center or may be distributed across multiple locations or data centers in distinct geographic regions. Further still, computer system 900 may represent an access point from which such a cluster or multi-computer system may be accessed and/or controlled. Any of these or their components or variants may be referred to herein as "computing apparatus" or a "computing device."

In example embodiments, data 919 may correspond to sensor measurements or other data recorded during a marine geophysical survey, or may correspond to a survey plan for implementing any of the methods described herein. Instructions 917 may correspond to algorithms for performing any of the methods described herein, or for producing a computer-readable survey plan for implementing one or more of such methods. In such embodiments, instructions 917, when executed by one or more computing devices such as one or more of CPU cores 902, cause the computing device to perform operations described herein on the data, producing results that may be stored in one or more non-transitory computer-readable media such as medium 918. In such embodiments, medium 918 constitutes a geophysical data product that is manufactured by using the computing device (and in come cases vessels, sources, and sensors) to perform methods described herein and by storing the results in the medium. Geophysical data product 918 may be stored locally or may be transported to other locations where further processing and analysis of its contents may be performed. If desired, a computer system such as computer system 900 may be employed to transmit the geophysical data product electronically to other locations via a network interface 920 and a network 922 (e.g. the Internet). Upon receipt of the transmission, another geophysical data product may be manufactured at the receiving location by storing contents of the transmission, or processed versions thereof, in another non-transitory computer readable medium. Similarly, geophysical data product 918 may be manufactured by using a local computer system 900 to access one or more remotely-located computing devices in order to execute instructions 917 remotely, and then to store results from the computations on a medium 918 that is attached either to the local computer or to one of the remote computers. The word "medium" as used herein should be construed to include one or more of such media.

EXAMPLE EMBODIMENTS

Figure 10:
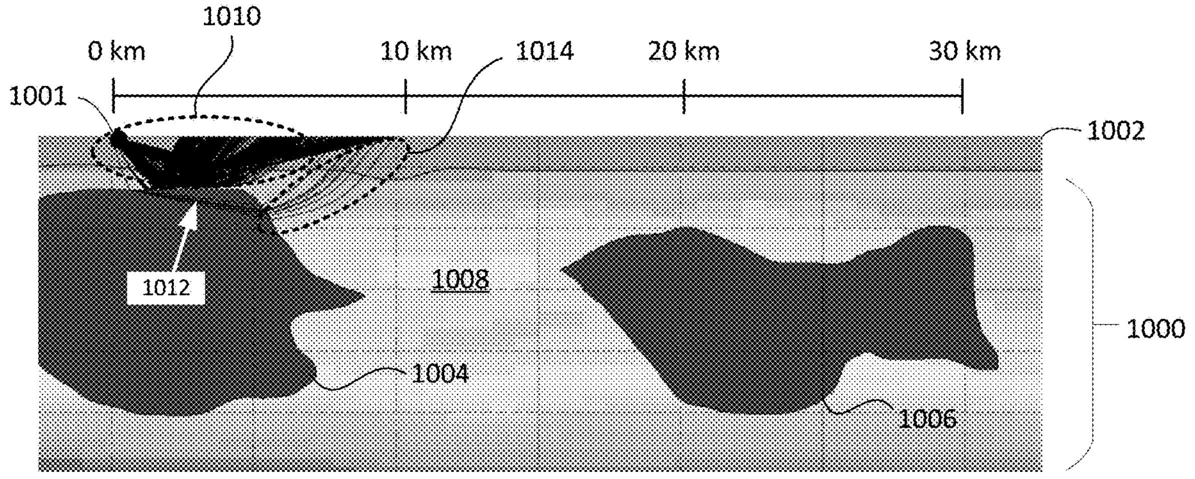
FIG. 10 is a side view illustrating a body of water and a subsurface that contains geological features in which acoustic energy from an active seismic source is refracted.

FIG. 10 is a model illustrating geological features in a subsurface 1000 disposed below a body of water 1002. In the model, features 1004 and 1006 exhibit physical properties that differ from those of the surrounding materials generally indicated at 1008. Such is often the case, for example, when salt formations exist in layers of sediment or rock. Because acoustic energy propagates differently in salt formations than it does in the layers of sediment or rock that contain them, acoustic energy entering a salt formation from above may be refracted within the salt formation before exiting at another boundary of the salt formation and continuing further downward toward deeper layers of the subsurface. The same phenomenon may occur when features other than salt formations are present in the subsurface.

FIG. 10 illustrates this phenomenon happening within feature 1004. Acoustic energy is emitted by an active seismic source 1001 located near the water surface at the 0 km point on the distance legend. Dashed outline 1010 indicates a region in which the emitted acoustic energy travels downward toward feature 1004 and is reflected back upward by the upper boundary of the feature. A portion of the acoustic energy is refracted within the feature, as indicated at 1012. Dashed outline 1014 indicates a region in which the refracted energy exits feature 1004 at a different boundary and travels back upward. In the scenario illustrated by FIG. 10, all of the reflected and refracted energy may be registered by sensors disposed within a 10 km offset distance relative to the source.

Figure 11:
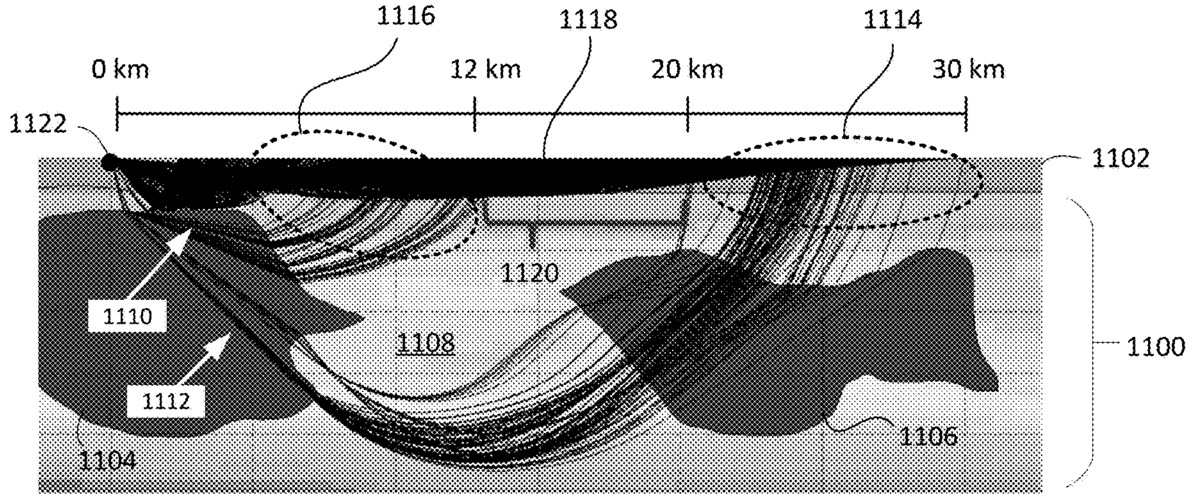
FIG. 11 is a side view illustrating a body of water and a subsurface that contains geological features in which acoustic energy from an active seismic source is refracted such that a shadow zone is created, in accordance with embodiments.

FIG. 11 is a model illustrating a different scenario. As in the model of FIG. 10, the model of FIG. 11 illustrates features 1104 and 1106 disposed within layers of sediment or rock 1108 in a subsurface 1100, which is itself disposed below a body of water 1102. Also as in FIG. 10, an active seismic source emits acoustic energy in FIG. 11 near the water surface at the 0 km point on the distance legend. In the scenario of FIG. 11, however, the physical properties of feature 1104 are such that a first portion of acoustic energy 1110 is refracted in a first direction, while a second portion 1112 of the acoustic energy is refracted in a second direction different than the first direction. Consequently, portion 1112 of the acoustic energy exits formation 1104 at a different boundary and is further refracted by the surrounding layers of sediment or rock 1108 until it enters formation 1106 and is ultimately refracted back upward toward the surface in a region indicated by dashed outline 1114. Meanwhile, portion 1110 of the acoustic energy is refracted upward toward the surface in a region indicated by dashed outline 1116.

As can be seen from the illustration, sensors disposed within 12 km from the source could register all of refracted energy 1110 but none of refracted energy 1112. Similarly, sensors disposed between 20 km and 30 km from the source could register all of refracted energy 1112 but none of refracted energy 1110. Notably, sensors disposed between 12 km and 20 km would not register any reflected source energy or refracted source energy that would be relevant for gaining useful information about targets in the subsurface. Accordingly, the region indicated by bracket 1120 in FIG. 11, consisting of offset distances between 12 km and 20 km, is referred to herein as a shadow zone. The term "shadow zone" as used herein refers to a distance interval, relative to a source location, over which substantially no reflected energy and substantially no refracted energy from the source is received from target depths by a sensor disposed within the distance interval, where "target depths" refers to depths in the subsurface at which geological features of interest to the survey are disposed. (An example of a geological feature of interest to a survey would be a geological feature for which an image is to be generated using data acquired by the survey or by a future survey that utilizes data acquired by the survey.) Thus, the distance interval denoted by bracket 1120 is a shadow zone relative to source location 1122.

Marine seismic surveying configurations and techniques will now be described that are well suited for survey areas that exhibit one or more shadow zones.

Figure 12:
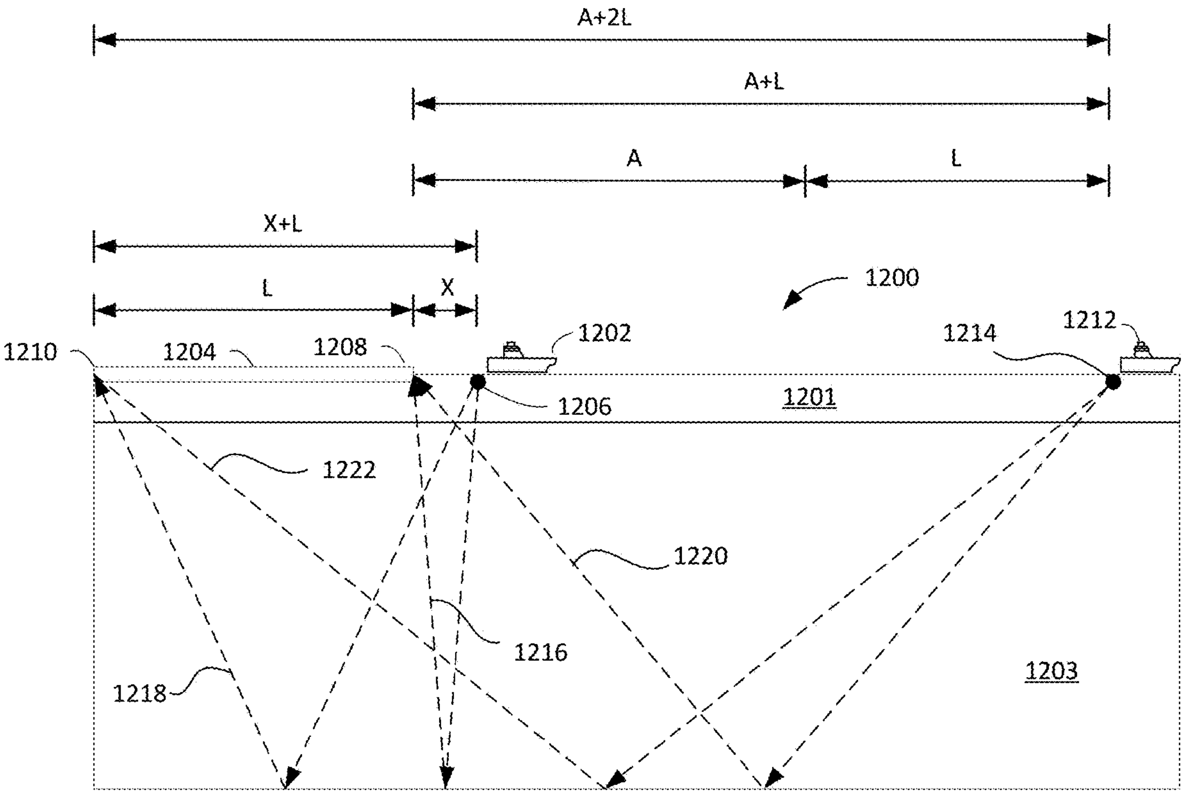
FIG. 12 is a side view schematically illustrating a first example class of towed streamer marine seismic survey configurations in accordance with embodiments.

FIG. 12 illustrates a first such survey configuration, 1200, by way of example. In configuration 1200, a vessel 1202 tows a streamer spread 1204 and an active seismic source 1206 behind the vessel in a body of water 1201 over a subsurface 1203.

Streamer spread 1204, as well as the streamer spreads in any of the embodiments described herein, may comprise one or more elongate streamers in which seismic sensors are disposed at spaced apart intervals along the length of each streamer—for example according to any of the arrangements described above. Active seismic source 1206, as well as the active seismic sources in any of the embodiments described herein, may comprise one or more source elements—also according to any of the arrangements described above. The source elements may be of the same type or may be of different types. For example, the source elements may comprise air guns, or marine vibrators, or both. In some embodiments, all of the streamers in the streamer spread may have the same length. In other embodiments, the lengths of the streamers in the spread may differ. In either case, the length of a longest streamer in the streamer spread will be denoted L in the following discussion.

In the embodiment of FIG. 12, source 1206 is towed ahead of a lead end 1208 of the streamer spread by a distance X. Distance X may differ in various embodiments. In the illustrated embodiment, distance X is a positive number, such that the source is towed ahead of the lead end of the streamer spread. (The words "lead" and "tail" as used herein are relative to the direction of tow.) In other embodiments, the distance X may be a number in the range 0 to −L, inclusive, such that the first source is towed at or between the lead end 1208 and a tail end 1210 of the streamer spread. In the latter embodiments, the source may be towed over at least a portion of the streamer spread.

Vessel 1212 in FIG. 12 tows an active seismic source 1214 but does not tow streamers. In the embodiment shown, vessel 1212 sails ahead of vessel 1202 such that source 1214 is ahead of the front end of the streamer spread by a distance A+L, where A is a positive number larger than the absolute value of distance X.

As the marine seismic survey proceeds, sources 1206, 1214 are activated, and sensors in the streamers record energy from both sources. In various embodiments, the sources may be activated in a manner that will facilitate de-blending of the energy emitted by the sources. "De-blending" refers to any of several known techniques by which mixed energy from two or more sources used during a seismic survey is separated such that energy attributable to each individual source is isolated from energy attributable to the other sources. In various embodiments, sources 1206, 1214 may be activated simultaneously, near-simultaneously, or at separate times. In either case, the de-blending process may make use of dithering of the source activation times or locations, where dithering refers to random or pseudo-random differences in source activation times or locations from one shot point to a next shot point for a given source. Because sources 1206, 1214 are spatially separated by a significant distance, the de-blending process may also make use of angles of incidence in the source energy recorded by the sensors in the streamers. Other source activation and de-blending techniques may also be employed.

Sensors in the streamers record energy from the sources over two different offset ranges.

The minimum offset distance recorded for source 1206 is measured from source 1206 to a nearest sensor in the streamer spread (in this case, the sensor or sensor group nearest to the front end of the streamer spread), which distance is equal to X. The maximum offset distance recorded for source 1206 is measured from source 1206 to a farthest sensor in the streamer spread (in this case, the sensor or sensor group nearest to the tail end of the streamer spread), which distance is equal to X+L. Thus, for source 1206, sensors in the streamers record offsets over a range of distances from X to X+L. Example ray paths for reflected energy corresponding to the minimum and maximum offset distances in this offset range are indicated in the drawing with dashed arrows 1216 (minimum offset) and 1218 (maximum offset).

The minimum offset distance recorded for source 1214 is measured from source 1214 to a nearest sensor in the streamer spread (in this case, the sensor or sensor group nearest to the front end of the streamer spread), which distance is equal to A+L. The maximum offset distance recorded for source 1214 is measured from source 1214 to a farthest sensor in the streamer spread (in this case, the sensor or sensor group nearest to the tail end of the streamer spread), which distance is equal to A+2L. Thus, for source 1214, sensors in the streamers record offsets over a range of distances from A+L to A+2L. Example ray paths for reflected energy corresponding to the minimum and maximum offset distances in this offset range are indicated in the drawing with dashed arrows 1220 (minimum offset) and 1222 (maximum offset).

Figure 13:
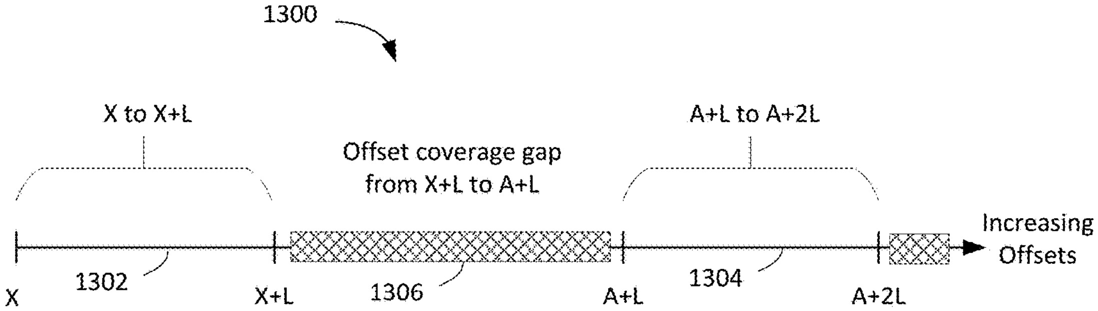
FIG. 13 is a schematic diagram illustrating offset ranges recorded by sensors in the streamers in the embodiments of FIGS. 12 and 14.

FIG. 13 illustrates the two offset ranges of FIG. 12 along a graph 1300 that depicts offset distances increasing from left to right. Line segment 1302 in the graph indicates the recorded offset range for source 1206. Line segment 1304 in the graph indicates the recorded offset range for source 1214. As the graph illustrates, an offset coverage gap 1306 exists in the range of distances between X+L and A+L. No energy is recorded by sensors in the streamers at offsets in this range from either of sources 1206 or 1214. In embodiments that employ more than two sources, the additional sources are deployed at distances from the streamers such that no energy is recorded at offsets in this range from the additional sources either, thus preserving offset coverage gap 1306.

Figure 14:
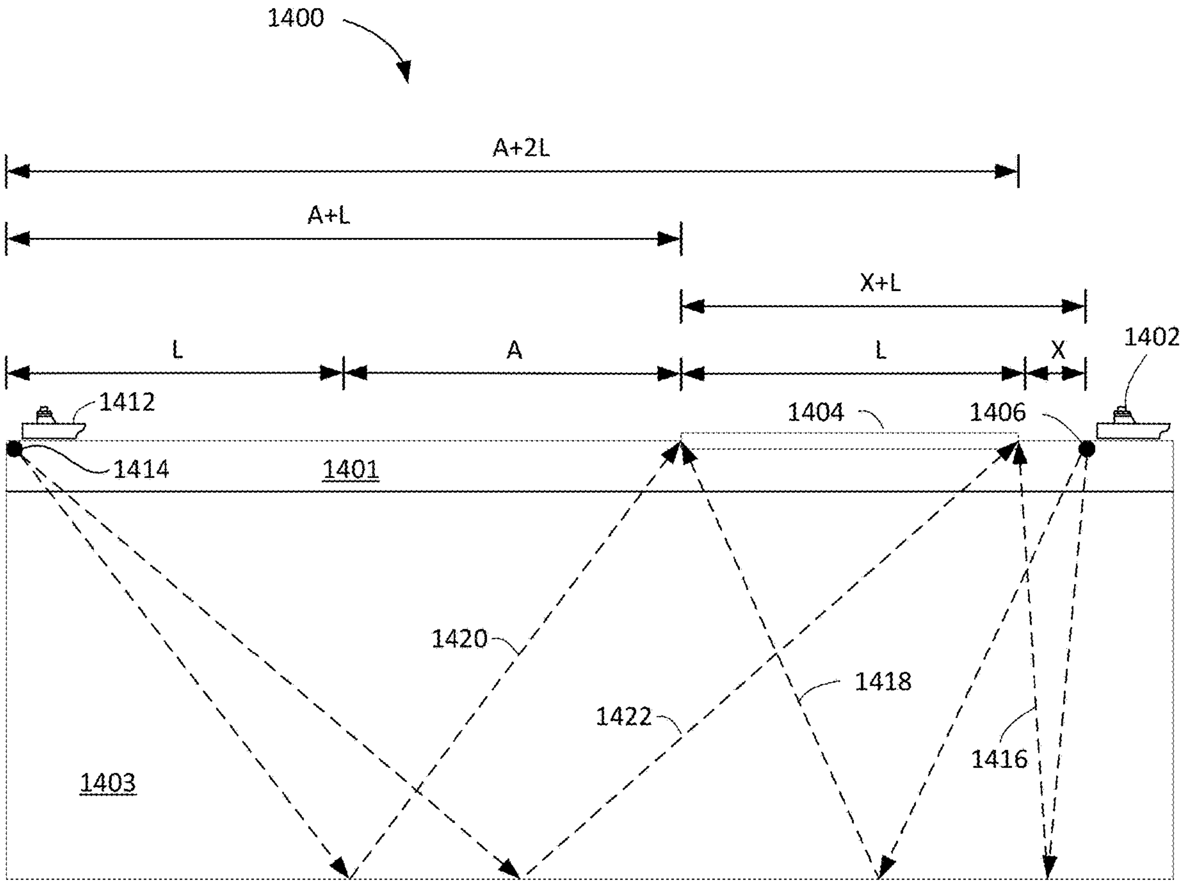
FIG. 14 is a side view schematically illustrating a second example class of towed streamer marine seismic survey configurations in accordance with embodiments.

FIG. 14 illustrates a second such survey configuration, 1400, by way of further example. In configuration 1400, a vessel 1402 tows a streamer spread 1404 and an active seismic source 1406 behind the vessel in a body of water 1401 over a subsurface 1403. In the illustrated example, source 1406 is towed ahead of the lead end of the streamer spread by a distance X. Distance X may differ in various embodiments in the same manner as was described above. In the illustrated embodiment, distance X is a positive number, such that the source is towed ahead of the lead end of the streamer spread. In other embodiments, the distance X may be a number in the range 0 to −L, inclusive, such that the source is towed at or between the lead end and the tail end of the streamer spread. In the latter embodiments, the source may be towed over at least a portion of the streamer spread.

Vessel 1412 tows an active seismic source 1414 but does not tow streamers. In the illustrated embodiment, vessel 1412 sails behind vessel 1402 such that source 1414 is disposed behind the tail end of the streamer spread by a distance A+L. As the survey progresses, sources 1406, 1412 are activated, and sensors in the streamers recorded energy from both sources.

As was the case in the configuration of FIG. 12, the sensors in the streamers record energy from the sources over two different offset ranges. The minimum offset distance recorded for source 1406 corresponds to example ray path 1416 in the drawing, which distance is equal to X. The maximum offset distance recorded for source 1406 corresponds to example ray path 1418 in the drawing, which distance is equal to X+L The minimum offset distance recorded for source 1414 corresponds to example ray path 1420 in the drawing, which distance is equal to A+L. The maximum offset distance recorded for source 1414 corresponds to example ray path 1422 in the drawing, which distance is equal to A+2L The offset ranges recorded for the two sources therefore correspond exactly to those depicted in graph 1300. Like configuration 1300, configuration 1400 produces an offset coverage gap in the range of distances between X+L and A+L. No energy is recorded by sensors in the streamers at offsets in this range from either of sources 1406 or 1414. In embodiments that employ more than two sources, the additional sources are deployed at distances from the streamers such that no energy is recorded at offsets in this range from the additional sources either, thus preserving offset coverage gap 1306.

Figure 15:
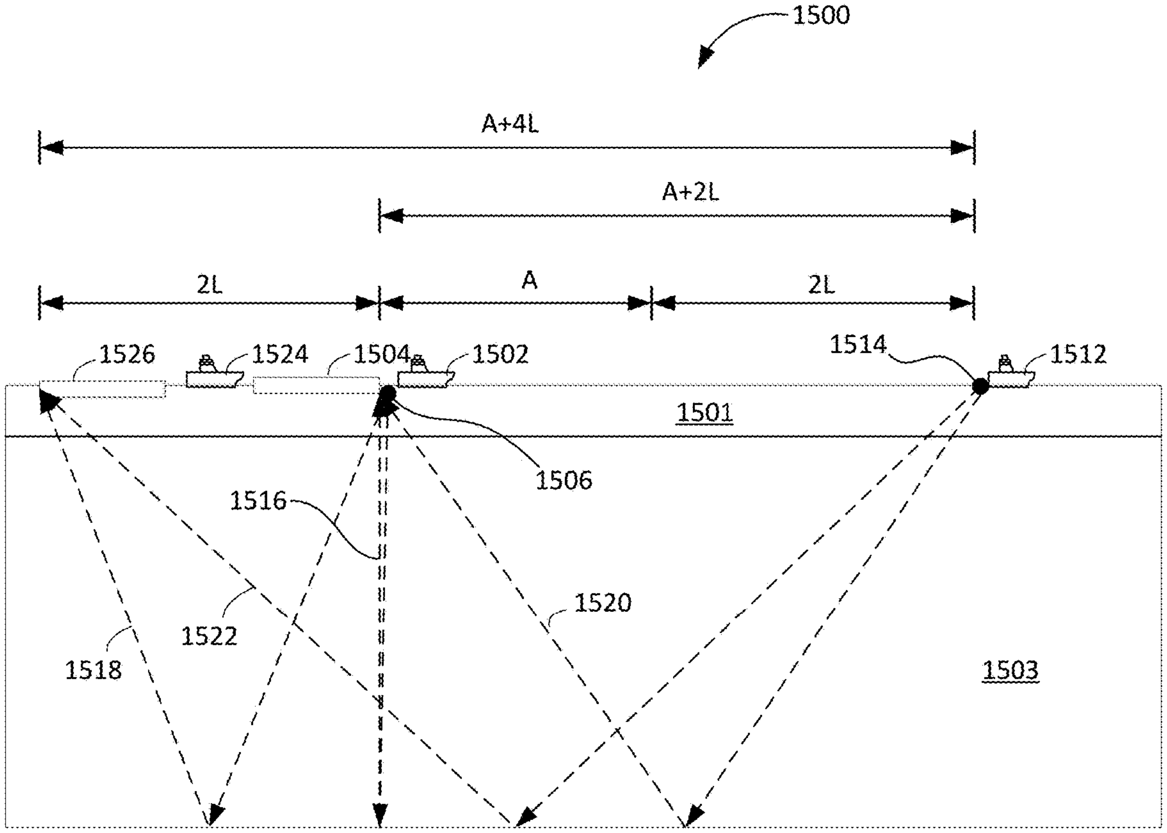
FIG. 15 is a side view schematically illustrating a third example class of towed streamer marine seismic survey configurations in accordance with embodiments.

FIG. 15 illustrates a third such configuration, 1500, by way of example. Configuration 1500 is similar to configurations 1300 and 1400 in that vessel 1502 tows a streamer spread 1504 and an active seismic source 1506 in a body of water 1501 over a subsurface 1503. Also as in configurations 1300, 1400, vessel 1512 tows an active seismic source 1514 but does not tow a streamer spread. In contrast to configurations 1300 and 1400, however, a third vessel 1524 in configuration 1500 tows an additional streamer spread 1526. Vessel 1524 does not tow a source, but tows streamer spread 1526 behind streamer spread 1504 to form a composite streamer spread that extends from the front of streamer spread 1504 to the tail of streamer spread 1526. For simplicity of discussion, the length of the composite streamer spread will be referred to herein as 2L. The length of the streamers in spread 1526 need not actually be identical, however, to the length of the streamers in spread 1504. In addition, vessel 1524 may be sailed a sufficient distance behind the tail end of streamer spread 1504 so as to avoid collision or entanglement. Accordingly, the term "2L" and its multiples when used in reference to the length of the composite streamer spread in FIG. 15 and its variants should be interpreted to mean the distance from the front end of streamer spread 1504 to the tail end of streamer spread 1526, regardless of whether streamer spreads 1504, 1526 differ in length, and regardless of the size of the following distance observed by vessel 1524.

As in configurations 1300 and 1400, source 1506 may be towed relative to the front of streamer spread 1504 by a distance X, which distance may vary as described above. Distance X is not specifically illustrated in FIG. 15 so as not to overly complicate the drawing.

In configuration 1500, the minimum offset distance recorded for source 1506 corresponds to example ray path 1516, leading from source 1506 to the front end of streamer spread 1504, which distance is equal to X. The maximum offset distance recorded for source 1506 corresponds to example ray path 1518, leading from source 1506 to the tail end of streamer spread 1526, which distance is equal to X+2L. The minimum offset distance recorded for source 1514 corresponds to example ray path 1520, leading from source 1514 to the front end of streamer spread 1504, which distance is equal to A+2L. The maximum offset distance recorded for source 1514 corresponds to example ray path 1522, leading from source 1514 to the tail end of streamer spread 1526, which distance is equal to A+4L.

Figure 16:
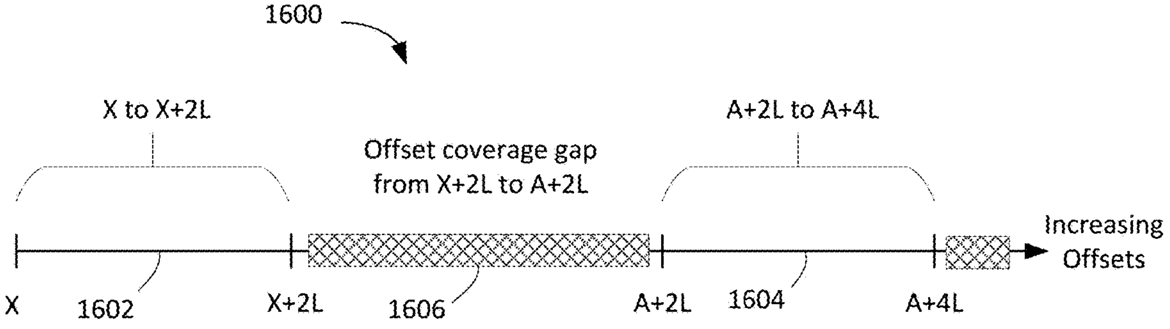
FIG. 16 is a schematic diagram illustrating offset ranges recorded by sensors in the streamers in the embodiment of FIG. 15.

FIG. 16 illustrates the two offset ranges of FIG. 15 along a graph 1600 that depicts offset distances increasing from left to right. Line segment 1602 in the graph indicates the recorded offset range for source 1506. Line segment 1604 in the graph indicates the recorded offset range for source 1514. As the graph illustrates, an offset coverage gap 1606 exists in the range of distances between X+2L and A+2L. No energy is recorded by sensors in the streamers at offsets in this range from either of sources 1506 or 1514. In embodiments that employ more than two sources, the additional sources are deployed at distances from the streamers such that no energy is recorded at offsets in this range from the additional sources either, thus preserving offset coverage gap 1606.

As was the case with configurations 1300 and 1400, configuration 1500 may be varied by sailing vessel 1512 behind the composite streamer spread such that source 1514 follows the tail end of the composite streamer spread by a distance A+2L. The resulting offset ranges recorded in such a configuration will correspond exactly to those illustrated in FIG. 16.

Determination of Distance A

The distance A used in any of the above survey configurations may correspond to the size(s) of one or more shadow zones in the survey area. The distance can be pre-determined during survey planning—for example by seismic modeling—or can be estimated and/or optimized by data analysis that is performed while the survey is progress. In any such surveys, the distance A can be either a fixed or a variable parameter. For example, in survey areas that exhibit changes in geology (e.g., changes in target depths, thickness of geological structures, acoustic parameters, or water depth), the parameter A can be dynamically adjusted in a manner that corresponds to the changes in geology as the survey progresses over the survey area. Thus, the distance A used during a survey can be adjusted dynamically on demand.

In many scenarios, it will be advantageous to use a distance A that is substantially larger than, for example, the distance X in configurations 1300, 1400, 1500, and substantially larger than the following distance observed by vessel 1524 in configuration 1500. In such scenarios, using a distance A that is greater than or equal to 2 km may prove beneficial in order to acquire signals at offsets that are sufficiently long to accommodate commensurately large shadow zones. As was mentioned above, in any embodiments the distance X can be zero or can be a small distance—for example on the order of 100 meters—such that only the distances A and L and the various multiples and sums thereof described herein are relevant to the survey design.

Figure 17:
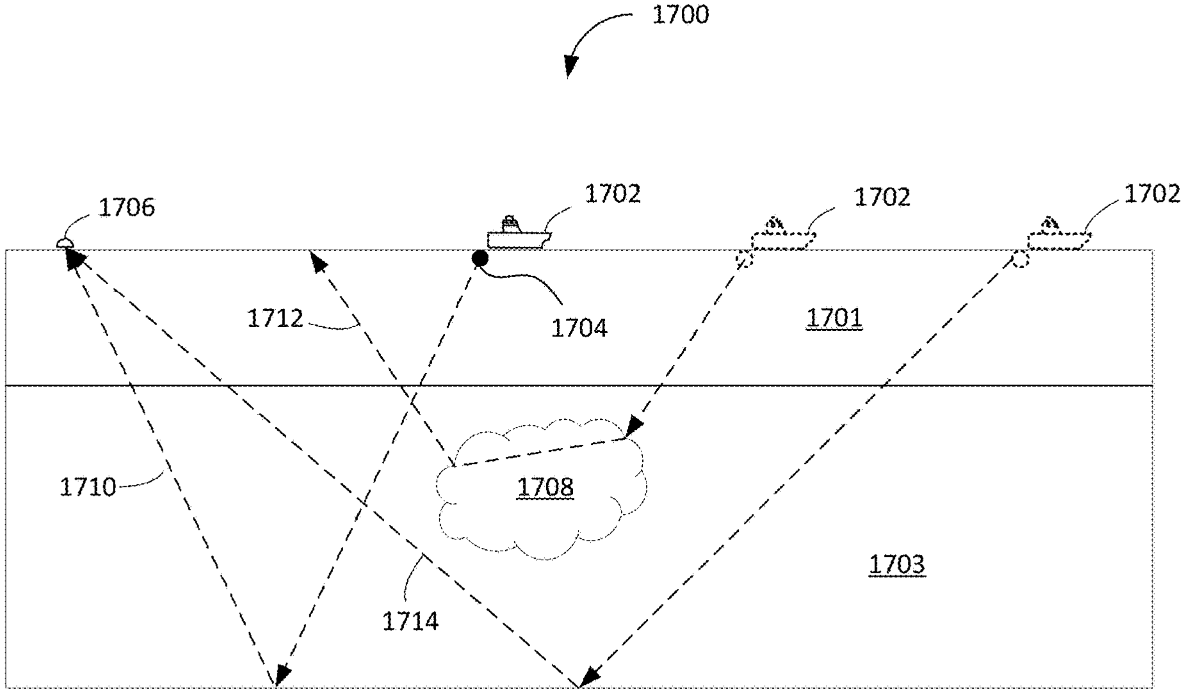
FIG. 17 is a side view schematically illustrating a pilot survey in accordance with embodiments.

In some embodiments, the parameter A may be determined by performing a pilot survey prior to performing the marine seismic survey in which the parameter A is to be used. FIG. 17 illustrates such a pilot survey, 1700, by way of example. In pilot survey 1700, one or more pilot sensors 1706 may be deployed. Although the term "pilot sensor" is used herein to describe sensors used in a pilot survey, a sensor used in such a survey may be any kind of geophysical sensor. For example, a pilot survey may use sensors disposed in towed streamers or in ocean bottom cables, the pilot survey may also or may alternatively employ sensors that comprise one or more nodes. The nodes may be deployed on the water bottom, or they may comprise floating nodes (as illustrated), or they may comprise a combination of these. The number of sensors used for the pilot survey may be small. For example, a single sensor may be used in the pilot survey, or two or three (or more) sensors may be used. To perform the pilot survey, a single pilot vessel 1702 tows a single pilot source 1704 in a body of water 1701 over a subsurface 1703. The source is activated at increasingly long offsets, from approximately 0 m to very long offsets, on the order of 30, 40, or 50 km. Meanwhile the pilot sensor records any signals that reach the sensor as the survey proceeds. For survey areas where shadow zones exist—for example shadow zones caused by anomalous geological features such as feature 1708—the pilot sensor may initially record signals from activations of source 1704 at moderate offsets (see 1710), but may cease to detect signals from source activations at offsets within the shadow zone (see 1712). As pilot vessel 1702 exits the shadow zone and activates the pilot source at even longer offsets, however, the pilot sensor may once again begin detecting reflected or refracted energy from the source (see 1714). Once this has been accomplished, the pilot sensor may be moved to another location in the survey area and the process repeated, if desired. In this manner, the locations and sizes of shadow zones in the survey area may be determined relatively inexpensively before the full marine seismic survey is performed.

A shadow zone identified by the pilot survey would correspond to a range offset distances between the pilot source and the pilot sensor over which substantially no reflected energy and substantially no refracted energy from the pilot source was received by the pilot sensor from target depths associated with the survey. For each shadow zone so identified, the size of this range of offset distances would correspond to the shadow zone length.

During the actual marine seismic survey, the distance A may be chosen so that it corresponds to the shadow zone length as determined during the pilot survey. For survey areas that exhibit multiple shadow zones having different lengths as determined by the pilot survey, the distance A used during the actual marine seismic survey may be varied accordingly as the actual marine seismic survey progresses over the survey area.

In other embodiments, the distance A used during the actual marine seismic survey may be varied based on real-time analysis of signals recorded by the sensors in the towed streamer spread(s). For instance, guided by pre-survey modeling and/or pilot survey results, if refraction energy from the target depths decreases or becomes absent on some or all of the receivers at some point during the survey, then the distance A can be adjusted (increased or decreased as indicated given the circumstances leading up to the change and the nature of the change observed), to better record the refraction energy that is of interest to the survey. Such real-time analysis can include careful tracking and analysis of refraction energy in the seismic data being recorded so that distance A can be adjusted to optimize the recording of refraction energy of interest as the survey progresses.

In further embodiments, the distance A used during the actual marine seismic survey may be varied based on one or more of: changes in depth of geological features that are of interest to the survey (i.e., "targets"), thicknesses of geological features in the subsurface, differences in acoustic parameters in different parts of the survey area or at different depths, and differences in water depth over the survey area.

Source Types

In some embodiments, the source types towed by the source-only vessel in configurations 1300, 1400, 1500 may differ from the source types towed by the streamer vessel. In such embodiments, the sources towed by the streamer vessel may comprise conventional or broadband seismic sources, while the source types towed by the source-only vessels may comprise lower-frequency seismic sources. In this context, the term "conventional or broadband" refers to sources that emit usable energy at frequencies in a range from about 8 Hz to about 200 Hz. The term "lower frequency" refers to sources that emit usable energy at frequencies below 8 Hz—for example, extending as low as about 1.5 Hz or lower. In one non-limiting example, the streamer vessel may tow an air gun source having a volume of 3,280 cubic inches, while the source-only vessel may tow higher-volume air gun source such as a source having a volume of 4,000 to 8,000 cubic inches. Other non-limiting examples of lower frequency sources include the low-frequency vibrational source called WOLFSPAR, which was designed and was built by British Petroleum, P.L.C, and the TPS source manufactured by Sercel, which has a volume of 28,000 cubic inches. In other embodiments, other source types and source volumes may be used by either vessel as appropriate given the characteristics of the area being surveyed and the design of the survey itself.

FWI, Velocity Model Building, and Imaging

In further embodiments, signals recorded by the streamer sensors from the source towed by the streamer vessel (the signals recorded in the shorter of the two offset ranges acquired during the survey) may be used, in accordance with known techniques, for generating an image of the geological features of the subsurface under the survey area. To support the imaging, signals recorded by the streamer sensors from the sources towed by the source-only vessel (the signals recorded in the longer of the two offset rages acquired during the survey) may be used, also in accordance with known techniques, to develop a velocity model of the subsurface. For example, the latter signals may be used in a full waveform inversion ("FWI") process to develop the velocity model.

Methods

Figure 18:
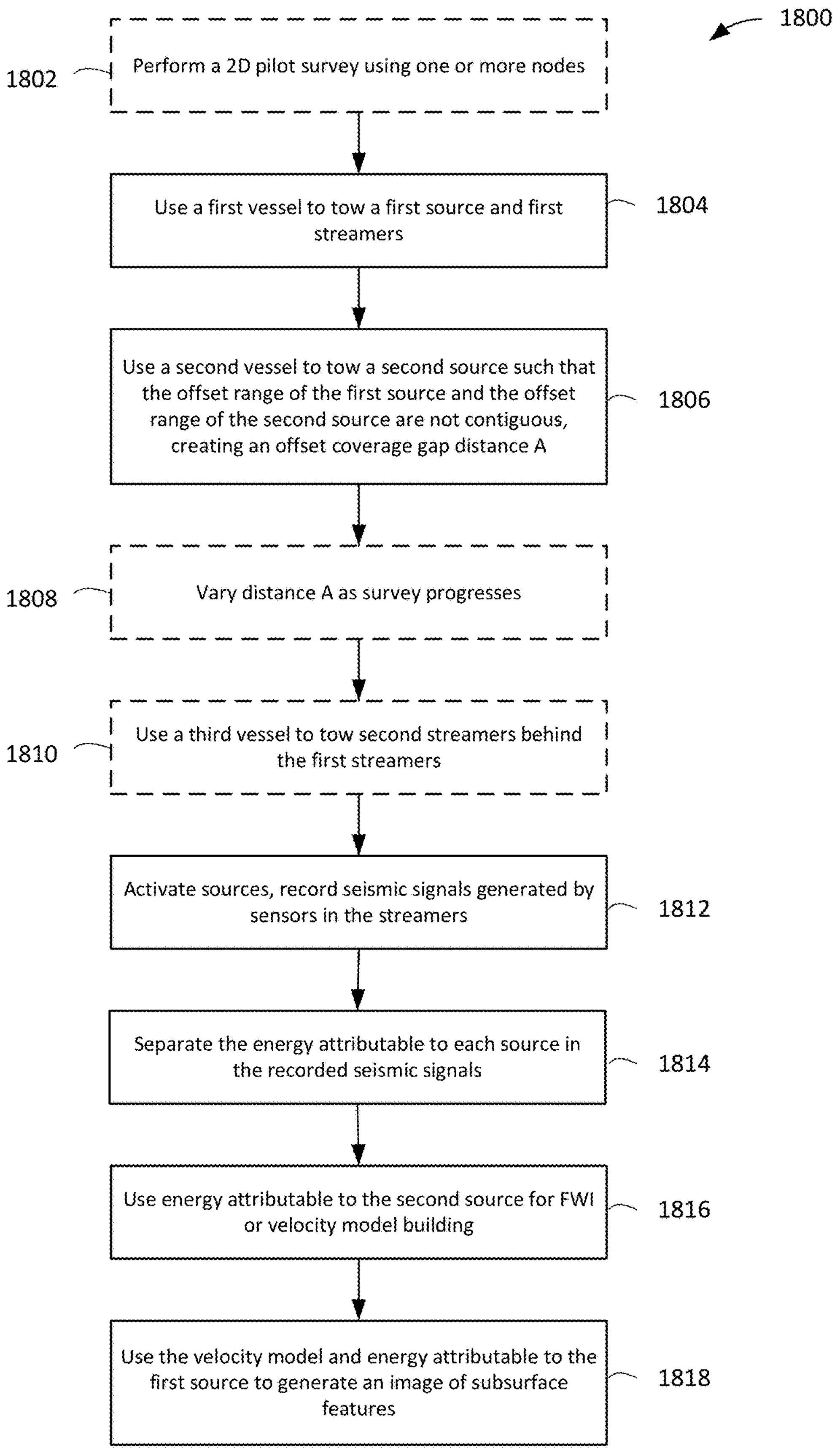
FIG. 18 is a flow diagram illustrating methods in accordance with embodiments for conducting extended long offset acquisitions with constant or dynamically adjusted offset coverage gaps.

FIG. 18 is a flow diagram summarizing the various techniques 1800 described above including several illustrative variations of those. In step 1804, a first vessel is used to tow a first source and a first streamer spread. In step 1806, a second vessel is used to tow a second source such that the offset range recordable by sensors in the streamers for the second source is not contiguous with the offset range recordable by sensors in the streamers for the first source. Thus, an offset coverage gap is created. Let the size of the offset coverage gap be denoted A.

In step 1812, the sources are activated, and the sensors in the streamers generate signals responsive to energy received from both sources. The generated signals may be recorded. In step 1814, the recorded signals are processed to separate (i.e., to isolate) the energy attributable to each source from the recorded signals. In step 1816, the energy attributed to the second source (the source associated with the longer of the two offset ranges) is used for building a velocity model of the subsurface. For example, the energy may be used in an FWI process to develop the velocity model. In step 1818, the velocity model is used in conjunction with the energy attributed to the first source (the source associated with the shorter of the two offset ranges) to generate an image of geological features in the subsurface.

In some embodiments (see step 1802), the offset coverage gap is determined based on results from a prior two-dimensional ("2D") pilot survey over the survey area, where the pilot survey employed one or more node sensors. In further embodiments (see step 1808), the distance between the source-only vessel and the streamer vessel used during the three-dimensional ("3D") survey of steps 1804 to 1812 may vary as the 3D survey progresses. The variation may be based on the results of the 2D pilot survey, or may be based on real-time analysis of data recorded during the 3D survey, or may be based on a combination of the two. In still further embodiments (see step 1810), a third vessel may be employed to tow a second streamer spread behind the first streamer spread to create a longer, composite streamer spread, in which case the distance between the source-only vessel and the composite streamer spread is adjusted accordingly to preserve the offset coverage gap.

Additional Aspects

In any embodiments, the source-only vessels need not sail directly inline with the vessel or vessels that tow the streamer spread. Rather, if desired, the source-only vessels may sail at various crossline offsets to the streamer vessel(s). Moreover, any of the offset types discussed above with reference to FIG. 8 can be applied where the term "offset" is used herein in reference to embodiments or classes of embodiments. For example, such offsets may be "inline offsets," or they may be "seismic offsets" in various embodiments.

In any embodiments, signals generated by sensors in the streamer spread, or data representative thereof, may be recorded in one or more non-transitory computer readable media. In this manner, the performance of a marine seismic survey according to the embodiments described herein, coupled with the recording of the signals generated thereby, constitutes the manufacture of a geophysical data product that comprises the non-transitory computer readable medium.

Embodiments such as those described above may provide numerous advantages. For example, they enable the acquisition of extended long offset data to support superior velocity model building in geologies that exhibit shadow zones, and they enable doing so by using only towed streamer marine seismic surveys, which are significantly less costly than surveys that employ ocean bottom nodes or ocean bottom cables.

FURTHER EXAMPLE EMBODIMENTS

The following is a non-limiting list of further example embodiments.

1. A method of performing a marine seismic survey, comprising:

towing a first streamer spread and a first source behind a first vessel, wherein streamers in the streamer spread comprise sensors disposed at spaced apart intervals along their lengths, a length of a longest streamer in the streamer spread is equal to L, a minimum offset distance measured from the first source to a nearest sensor in the streamer spread is equal to X, and a maximum offset distance measured from the first source to a farthest sensor in the streamer spread is equal to X+L, such that sensors in the streamer spread record offsets from the first source over a range of distances X to X+L;

towing a second source behind a second vessel that does not tow a streamer spread;

sailing the second vessel relative to the first vessel such that an offset between the second source and a nearest sensor in the streamer spread is equal to A+L, wherein A is a positive number larger than an absolute value of X, such that sensors in the streamer spread record offsets from the second source over a range of distances A+L to A+2L; and wherein sensors in the streamer spread do not record offsets over a range of distances X+L to A+L from any active seismic sources used in the marine seismic survey.

2. The method of example 1, wherein:

A is greater than or equal to 2 km.

3. The method of examples 1 or 2, wherein:

the first source comprises a broadband seismic source; and the second source comprises a low-frequency seismic source.

4. The method of any of the preceding examples, further comprising:

using signals recorded by the sensors from the second source for full-wave inversion or velocity model building; and using signals recorded by the sensors from the first source for imaging geological features of a subsurface.

5. The method of any of the preceding examples, further comprising:

performing a pilot survey prior to performing the marine seismic survey, wherein the pilot survey comprises a pilot source and a pilot sensor; and wherein the distance A used in the marine seismic survey corresponds to a length of a shadow zone measured by the pilot survey, where the shadow zone is a distance over which substantially no reflected energy and substantially no refracted energy was received from the pilot source by the pilot sensor during the pilot survey from target depths associated with the pilot survey.

6. The method of example 5, wherein:

the length of the shadow zone as measured by the pilot survey varies over a survey area; and the distance A is varied accordingly as the first and second vessels cover the survey area during the marine seismic survey.

7. The method of examples 5 or 6, wherein:

the pilot sensor comprises at least one node.

8. The method of example 7, wherein:

the at least one node comprises a floating node.

9. The method of any of the preceding examples, further comprising:

varying the distance A during the marine seismic survey based on real-time analysis of signals recorded by the sensors in the streamer spread.

10. The method of any of the preceding examples, further comprising:

varying the distance A during the marine seismic survey based on one or more of: changes in target depths, thickness of geological structures, acoustic parameters, and water depth.

11. The method of any of the preceding examples, wherein:

the second vessel sails ahead of the first vessel during the marine seismic survey.

12. The method of any of the preceding examples, wherein:
the second vessel sails aft of the first vessel during the marine seismic survey.
13. The method of any of the preceding examples, wherein:
the second vessel does not sail inline with the first vessel.
14. The method of any of the preceding examples:
further comprising using a third vessel to tow a second streamer spread behind the first streamer spread to form a composite streamer spread having a length equal to 2L, wherein streamers in the second streamer spread comprise sensors disposed at spaced apart intervals along their lengths, and the third vessel does not tow a source, such that sensors in the composite streamer spread record offsets from the first source over a range of distances X to X+2L;
wherein the second vessel sails relative to the first vessel such that an offset between the second source and a nearest sensor in the composite streamer spread is equal to A+2L, such that sensors in the composite streamer spread record offsets from the second source over a range of distances A+2L to A+4L; and
wherein sensors in the composite streamer spread do not record offsets over a range of distances X+2L to A+2L from any active seismic sources used in the marine seismic survey.
15. The method of any of the preceding examples, wherein:
X is a positive number, such that the first source is towed ahead of a lead end of the first streamer spread.
16. The method of any of the preceding examples, wherein:
X is a number in the range 0 to −L, inclusive, such that the first source is towed at or between a lead end of the first streamer spread and a tail end of the first streamer spread.
17. The method of any of the preceding examples, further comprising:
recording signals derived from the sensors in a non-transitory computer readable medium, thereby completing the manufacture of a geophysical data product.
18. The method of any of the preceding examples, wherein:
the offsets are inline offsets.
19. One or more non-transitory computer readable media having instructions store thereon that, if executed by one or more processors aboard one or more vessels, cause the one or more vessels to perform a marine seismic survey, comprising:
towing a first streamer spread and a first source behind a first vessel, wherein streamers in the streamer spread comprise sensors disposed at spaced apart intervals along their lengths, a length of a longest streamer in the streamer spread is equal to L, a minimum offset distance measured from the first source to a nearest sensor in the streamer spread is equal to X, and a maximum offset distance measured from the first source to a farthest sensor in the streamer spread is equal to X+L, such that sensors in the streamer spread record offsets from the first source over a range of distances X to X+L;
towing a second source behind a second vessel that does not tow a streamer spread;
sailing the second vessel relative to the first vessel such that an offset between the second source and a nearest sensor in the streamer spread is equal to A+L, wherein A is a positive number larger than an absolute value of X, such that sensors in the streamer spread record offsets from the second source over a range of distances A+L to A+2L; and
wherein sensors in the streamer spread do not record offsets over a range of distances X+L to A+L from any active seismic sources used in the marine seismic survey.
20. The media of example 19, wherein:
A is greater than or equal to 2 km.
21. The media of examples 19 or 20, wherein:
the first source comprises a broadband seismic source; and
the second source comprises a low-frequency seismic source.
22. The media of any of examples 19-21, further comprising instructions that, when executed by the one or more processors aboard the one or more vessels or by one or more other processors located elsewhere, cause the performance of:
using signals recorded by the sensors from the second source for full-wave inversion or velocity model building; and
using signals recorded by the sensors from the first source for imaging geological features of a subsurface.
23. The media of any of examples 19-22, further comprising:
performing a pilot survey prior to performing the marine seismic survey, wherein the pilot survey comprises a pilot source and a pilot sensor; and
wherein the distance A used in the marine seismic survey corresponds to a length of a shadow zone measured by the pilot survey, where the shadow zone is a distance over which substantially no reflected energy and substantially no refracted energy was received from the pilot source by the pilot sensor during the pilot survey from target depths associated with the pilot survey.
24. The media of example 23, wherein:
the length of the shadow zone as measured by the pilot survey varies over a survey area; and
the distance A is varied accordingly as the first and second vessels cover the survey area during the marine seismic survey.
25. The media of examples 23 or 24, wherein:
the pilot sensor comprise at least one node.
26. The media of example 25, wherein:
the at least one node comprises a floating node.
27. The media of any of examples 19-26, further comprising:
varying the distance A during the marine seismic survey based on real-time analysis of signals recorded by the sensors in the streamer spread.
28. The media of any of example 19-27, further comprising:
varying the distance A during the marine seismic survey based on one or more of: changes in target depths, thickness of geological structures, acoustic parameters, and water depth.
29. The media of any of examples 19-28, wherein:
the second vessel sails ahead of the first vessel during the marine seismic survey.
30. The media of any of examples 19-29, wherein:
the second vessel sails aft of the first vessel during the marine seismic survey.
31. The media of any of examples 19-30, wherein:
the second vessel does not sail inline with the first vessel.

32. The media of any of examples 19-31:

further comprising using a third vessel to tow a second streamer spread behind the first streamer spread to form a composite streamer spread having a length equal to 2L, wherein streamers in the second streamer spread comprise sensors disposed at spaced apart intervals along their lengths, and the third vessel does not tow a source, such that sensors in the composite streamer spread record offsets from the first source over a range of distances X to X+2L;

wherein the second vessel sails relative to the first vessel such that an offset between the second source and a nearest sensor in the composite streamer spread is equal to A+2L, such that sensors in the composite streamer spread record offsets from the second source over a range of distances A+2L to A+4L; and wherein sensors in the composite streamer spread do not record offsets over a range of distances X+2L to A+2L from any active seismic sources used in the marine seismic survey.

33. The media of any of examples 19-32, wherein:

X is a positive number, such that the first source is towed ahead of a lead end of the first streamer spread.

34. The media of any of examples 19-33, wherein:

X is a number in the range 0 to −L, inclusive, such that the first source is towed at or between a lead end of the first streamer spread and a tail end of the first streamer spread.

35. The media of any of examples 19-34, further comprising:

recording signals derived from the sensors in the or another non-transitory computer readable media, thereby completing the manufacture of a geophysical data product.

36. The media of any of examples 19-35, wherein:

the offsets are inline offsets.

Multiple specific embodiments have been described above and in the appended claims. Such embodiments have been provided by way of example and illustration. Persons having skill in the art and having reference to this disclosure will perceive various utilitarian combinations, modifications and generalizations of the features and characteristics of the embodiments so described. For example, steps in methods described herein may generally be performed in any order, and some steps may be omitted, while other steps may be added, except where the context clearly indicates otherwise. Similarly, components in structures described herein may be arranged in different positions or locations, and some components may be omitted, while other components may be added, except where the context clearly indicates otherwise. The scope of the disclosure is intended to include all such combinations, modifications, and generalizations as well as their equivalents.

What is claimed is:

1. A method of performing a marine seismic survey, comprising:

towing a first streamer spread and a first source behind a first vessel, wherein streamers in the streamer spread comprise sensors disposed at spaced apart intervals along their lengths, a length of a longest streamer in the streamer spread is equal to L, an offset distance measured from the first source to a sensor in the streamer spread nearest to the first source is equal to X, and an offset distance measured from the first source to a sensor in the streamer spread farthest from the first source is equal to X+L, such that sensors in the streamer spread record offsets from the first source over a range of distances X to X+L;

towing a second source behind a second vessel that does not tow a streamer spread;

sailing the second vessel relative to the first vessel such that an offset between the second source and a sensor in the streamer spread nearest to the second source is equal to A+L, wherein A is a positive number larger than an absolute value of X, such that sensors in the streamer spread record offsets from the second source over a range of distances A+L to A+2L; and wherein sensors in the streamer spread do not record offsets over a range of distances X+L to A+L from any active seismic sources used in the marine seismic survey.

2. The method of claim 1, wherein:

A is greater than or equal to 2 km.

3. The method of claim 1, wherein:

the first source comprises a broadband seismic source; and the second source comprises a low-frequency seismic source.

4. The method of claim 1, further comprising:

using signals recorded by the sensors from the second source for full-wave inversion or velocity model building; and using signals recorded by the sensors from the first source for imaging geological features of a subsurface.

5. The method of claim 1, further comprising:

performing a pilot survey prior to performing the marine seismic survey, wherein the pilot survey comprises a pilot source and a pilot sensor; and wherein the distance A used in the marine seismic survey corresponds to a length of a shadow zone measured by the pilot survey, where the shadow zone is a distance over which substantially no reflected energy and substantially no refracted energy was received from the pilot source by the pilot sensor during the pilot survey from target depths associated with the pilot survey.

6. The method of claim 5, wherein:

the length of the shadow zone as measured by the pilot survey varies over a survey area; and the distance A is varied accordingly as the first and second vessels cover the survey area during the marine seismic survey.

7. The method of claim 5, wherein:

the pilot sensor comprises at least one node.

8. The method of claim 7, wherein:

the at least one node comprises a floating node.

9. The method of claim 1, further comprising:

varying the distance A during the marine seismic survey based on real-time analysis of signals recorded by the sensors in the streamer spread.

10. The method of claim 1, further comprising:

varying the distance A during the marine seismic survey based on one or more of: changes in target depths, thickness of geological structures, acoustic parameters, and water depth.

11. The method of claim 1, wherein:

the second vessel sails ahead of the first vessel during the marine seismic survey.

12. The method of claim 1, wherein:

the second vessel sails aft of the first vessel during the marine seismic survey.

13. The method of claim 1, wherein:

the second vessel does not sail inline with the first vessel.

14. The method of claim 1:

further comprising using a third vessel to tow a second streamer spread behind the first streamer spread to form a composite streamer spread having a length equal to 2L, wherein streamers in the second streamer spread comprise sensors disposed at spaced apart intervals along their lengths, and the third vessel does not tow a source, such that sensors in the composite streamer spread record offsets from the first source over a range of distances X to X+2L;

wherein the second vessel sails relative to the first vessel such that an offset between the second source and a sensor in the composite streamer spread nearest to the second source is equal to A+2L, such that sensors in the composite streamer spread record offsets from the second source over a range of distances A+2L to A+4L; and wherein sensors in the composite streamer spread do not record offsets over a range of distances X+2L to A+2L from any active seismic sources used in the marine seismic survey.

15. The method of claim 1, wherein:

X is a positive number, such that the first source is towed ahead of a lead end of the first streamer spread.

16. The method of claim 1, wherein:

X is a number in the range 0 to −L, inclusive, such that the first source is towed at or between a lead end of the first streamer spread and a tail end of the first streamer spread.

17. The method of claim 1, wherein:

the offsets are inline offsets.

18. A method of manufacturing a geophysical data product, comprising:

towing a first streamer spread and a first source behind a first vessel, wherein streamers in the streamer spread comprise sensors disposed at spaced apart intervals along their lengths, a length of a longest streamer in the streamer spread is equal to L, an offset distance measured from the first source to a sensor in the streamer spread nearest to the first source is equal to X, and an offset distance measured from the first source to a sensor in the streamer spread farthest from the first source is equal to X+L, such that sensors in the streamer spread record offsets from the first source over a range of distances X to X+L;

towing a second source behind a second vessel that does not tow a streamer spread;

sailing the second vessel relative to the first vessel such that an offset between the second source and a sensor in the streamer spread nearest to the second source is equal to A+L, wherein A is a positive number larger than an absolute value of X, such that sensors in the streamer spread record offsets from the second source over a range of distances A+L to A+2L;

wherein sensors in the streamer spread do not record offsets over a range of distances X+L to A+L from any active seismic sources used in the marine seismic survey; and recording signals derived from the sensors, or representations thereof, in a non-transitory computer readable medium, thereby completing the manufacture of the geophysical data product.

19. One or more non-transitory computer readable media having instructions store thereon that, if executed by one or more processors aboard one or more vessels, cause the one or more vessels to perform a marine seismic survey, comprising:

towing a first streamer spread and a first source behind a first vessel, wherein streamers in the streamer spread comprise sensors disposed at spaced apart intervals along their lengths, a length of a longest streamer in the streamer spread is equal to L, an offset distance measured from the first source to a sensor in the streamer spread nearest to the first source is equal to X, and an offset distance measured from the first source to a sensor in the streamer spread farthest from the first source is equal to X+L, such that sensors in the streamer spread record offsets from the first source over a range of distances X to X+L;

towing a second source behind a second vessel that does not tow a streamer spread;

sailing the second vessel relative to the first vessel such that an offset between the second source and a sensor in the streamer spread nearest to the second source is equal to A+L, wherein A is a positive number larger than an absolute value of X, such that sensors in the streamer spread record offsets from the second source over a range of distances A+L to A+2L; and wherein sensors in the streamer spread do not record offsets over a range of distances X+L to A+L from any active seismic sources used in the marine seismic survey.

20. The media of claim 19, wherein:

A is greater than or equal to 2 km.

21. The media of claim 19, further comprising instructions that, when executed by the one or more processors aboard the one or more vessels or by one or more other processors located elsewhere, cause the performance of:

using signals recorded by the sensors from the second source for full-wave inversion or velocity model building; and using signals recorded by the sensors from the first source for imaging geological features of a subsurface.

22. The media of claim 19, further comprising:

performing a pilot survey prior to performing the marine seismic survey, wherein the pilot survey comprises a pilot source and a pilot sensor; and wherein the distance A used in the marine seismic survey corresponds to a length of a shadow zone measured by the pilot survey, where the shadow zone is a distance over which substantially no reflected energy and substantially no refracted energy was received from the pilot source by the pilot sensor during the pilot survey from target depths associated with the pilot survey.

23. The media of claim 22, wherein:

the length of the shadow zone as measured by the pilot survey varies over a survey area; and the distance A is varied accordingly as the first and second vessels cover the survey area during the marine seismic survey.

24. The media of claim 22, wherein:

the pilot sensor comprises at least one node.

25. The media of claim 19, further comprising:

varying the distance A during the marine seismic survey based on real-time analysis of signals recorded by the sensors in the streamer spread.

26. The media of claim 19, further comprising:

varying the distance A during the marine seismic survey based on one or more of: changes in target depths, thickness of geological structures, acoustic parameters, and water depth.

27. The media of claim 19:

further comprising using a third vessel to tow a second streamer spread behind the first streamer spread to form a composite streamer spread having a length equal to 2L, wherein streamers in the second streamer spread comprise sensors disposed at spaced apart intervals along their lengths, and the third vessel does not tow a source, such that sensors in the composite streamer spread record offsets from the first source over a range of distances X to X+2L;

wherein the second vessel sails relative to the first vessel such that an offset between the second source and a sensor in the composite streamer spread nearest to the second source is equal to A+2L, such that sensors in the composite streamer spread record offsets from the second source over a range of distances A+2L to A+4L; and wherein sensors in the composite streamer spread do not record offsets over a range of distances X+2L to A+2L from any active seismic sources used in the marine seismic survey.

28. The media of claim 19, further comprising:

recording signals derived from the sensors in the or another non-transitory computer readable media, thereby completing the manufacture of a geophysical data product.

* * * * *